US006856049B2

(12) United States Patent
Hirata

(10) Patent No.: US 6,856,049 B2
(45) Date of Patent: Feb. 15, 2005

(54) VOICE COIL LINEAR ACTUATOR, APPARATUS USING THE ACTUATOR, AND METHOD FOR MANUFACTURING THE ACTUATOR

(75) Inventor: Atsuhiko Hirata, Yasu-gun (JP)

(73) Assignee: Murata Manufacturing Co., Ltd. (JP)

( * ) Notice: Subject to any disclaimer, the term of this patent is extended or adjusted under 35 U.S.C. 154(b) by 34 days.

(21) Appl. No.: 10/444,596

(22) Filed: May 23, 2003

(65) Prior Publication Data

US 2003/0218391 A1 Nov. 27, 2003

(30) Foreign Application Priority Data

| May 24, 2002 | (JP) | ........................................ 2002-150580 |
| Jul. 3, 2002 | (JP) | ........................................ 2002-194650 |
| Apr. 15, 2003 | (JP) | ........................................ 2003-110681 |

(51) Int. Cl.[7] .......................... H02K 41/00; H02K 33/18
(52) U.S. Cl. ........................................... 310/12; 310/14
(58) Field of Search ...................................... 310/12–14

(56) References Cited

U.S. PATENT DOCUMENTS 4,612,420 A * 9/1986 Nieuwendijk et al. ...... 341/149
5,909,499 A * 6/1999 Tanabe ........................ 381/419

FOREIGN PATENT DOCUMENTS

| JP | 57-185798 | * 11/1982 | ............ H04R/9/04 |
| JP | 8-33304 | 2/1996 | |
| JP | 11-69755 | 3/1999 | |
| JP | 11-299210 | 10/1999 | |
| JP | 2000-166211 | 6/2000 | |

* cited by examiner

*Primary Examiner*—Thanh Lam
*Assistant Examiner*—Judson H. Jones
(74) *Attorney, Agent, or Firm*—Ostrolenk, Faber, Gerb & Soffen, LLP

(57) ABSTRACT

A voice coil linear actuator comprises: an axially-shaped center yoke formed of a ferromagnetic material; an armature coil concentrically disposed so as to move along the axial direction of the center yoke; and a plurality of ring-shaped permanent magnets which have N and S magnetic poles arranged in the radial direction thereof, and are disposed concentrically as to the armature coil. The armature coil has armature coil units distributed in at least three positions in the axial direction, with adjacent pairs of the armature coil units being arranged so that electric current flows through them in opposite directions, respectively. The permanent magnets are distributed in at least three positions in the axial direction at positions facing respective armature coil units in the radial direction. The respective directions of the N magnetic poles of adjacent permanent magnets are arranged facing in opposite directions.

13 Claims, 35 Drawing Sheets

SYMMETRICAL AXIS

SYMMETRICAL AXIS

SYMMETRICAL AXIS

SYMMETRICAL AXIS

SYMMETRICAL AXIS

VOICE COIL LINEAR ACTUATOR, APPARATUS USING THE ACTUATOR, AND METHOD FOR MANUFACTURING THE ACTUATOR

BACKGROUND OF THE INVENTION

1. Field of the Invention

The present invention relates to a voice coil linear actuator, an apparatus using the actuator, and a method for manufacturing the actuator.

2. Description of the Related Art

Voice coil linear actuators are used in arrangements wherein linear actions are performed for relatively short distances, such as with a mounting head of an electronic parts mounting apparatus, for example.

Generally, voice coil linear actuators generate thrust by mutual action between a magnetic field from a magnet and an electric current flowing through a coil, and there are two general arrangements for this. One is an arrangement wherein the magnet is fixed and the coil moves, and the other is an arrangement wherein the coil is fixed and the magnet moves.

Arrangements disclosed in Japanese Unexamined Patent Application Publication No. 11-299210 and Japanese Unexamined Patent Application Publication No. 11-69755, for example, are known arrangements of the coil moving type. This conventional arrangement has a magnet which is magnetized in the radial direction and disposed on a surface of a yoke. The coil is disposed in the magnetic gap, and a current is applied to the coil, thereby generating thrust. Also, another embodiment disclosed in Japanese Unexamined Patent Application Publication No. 11-69755 describes an arrangement wherein a magnet which is magnetized in the axial direction is arranged in the axial direction of the center yoke, and yet another embodiment disclosed in Japanese Unexamined Patent Application Publication No. 11-69755 describes an arrangement having two magnets with opposite polarity which are magnetized in the radial direction and disposed on a surface of a yoke.

Now, it is desirable that actuators be capable of speedy acceleration and deceleration. Thrust must be increased to achieve this. Increasing the magnetic flux density of the magnetic gap or increasing the electric current flowing through the coil can be conceived as simple means for increasing the thrust. However, applying a great current to the coil increases the amount of heat generated at the coil, causing problems such as thermal deformation in the surrounding members, deterioration of the magnet due to the heat, and so forth. Accordingly, it is preferable to increase the magnetic flux density of the magnetic gap. Further, in the event of using the actuator in a mounting head for a parts mounting apparatus, reduction in the size and weight of the mounting head is required. That is to say, there is a demand for a voice coil actuator which has increased magnetic flux density to improve thrust, while being reduced in size. However, attempts to reduce the size of conventional voice coil linear actuators have had the following problems.

With conventional arrangements, there is only one magnetic circuit passing through the yoke, magnet, and armature coil. Accordingly, the maximum magnetic flux transmission is restricted by the path area of the magnetic flux in the yoke, so the magnetic flux density becomes saturated within the yoke, and the operating point of the magnet drops. Accordingly, obtaining high magnetic flux density is difficult, and great thrust cannot be obtained. Particularly, attempting to meet the demand for reducing the size of the actuator in the radial direction makes the center yoke narrower, and the outer yoke portion thin as well. Accordingly, obtaining high magnetic flux density becomes even more difficult.

Now, of the conventional structures shown in Japanese Unexamined Patent Application Publication No. 11-69755, the reason that a pair of magnets with opposite polarity are used is that the magnetic flux density increases due to the reduced magnetic resistance, thereby improving the thrust somewhat in comparison with the other conventional art. However, the effects thereof are limited, and there has also been the problem that this arrangement is difficult to assemble.

SUMMARY OF THE INVENTION

The present invention has been made in light of the above-described problems, and accordingly, provides a voice coil linear actuator wherein great thrust can be obtained with a reduced size, an apparatus using the actuator, and a method for winding the coil thereof.

The voice coil linear actuator according to the present invention comprises: an axially-shaped center yoke formed of a ferromagnetic material ferromagnetic material; an armature coil concentrically disposed so as to move along the axial direction of the center yoke; and ring-shaped permanet magnets which have the N and S magnetic poles in the radial direction thereof, and are disposed concentrically as to the armature coil; wherein the armature coil has armature coil units distributed in at least three positions in the axial direction, with the armature coil units adjacent one to another being arranged so as to carry electric current in opposite respective directions; and wherein the permanent magnets are distributed in at least three positions in the axial direction at positions facing respective armature coil units in the radial direction, with the respective N magnetic poles of adjacent permanent magnets facing in opposite radial directions.

With the voice coil linear actuator according to the present invention, multiple magnetic circuits are formed in the axial direction by permanent magnets which are distributed in at least three positions in the axial direction, so magnetic resistance can be reduced as compared to conventional arrangements wherein there is only one primary magnetic circuit formed by permanent magnets, so higher thrust can be obtained with the same amount of coil. In other words, the same amount of thrust can be obtained with less coil. Also, particularly high magnetic flux density can be obtained due to the primary magnetic circuits being added. That is, the magnetic flux density corresponding to the positions of the permanent magnets sandwiched between opposite magnetic poles becomes extremely great. Accordingly, magnetic flux density is improved by more than enough to offset reduction in size of the overall actuator, so that not only can deterioration in thrust be suppressed, but also, increased thrust can be realized.

With the voice coil linear actuator according to the present invention, the permanent magnet may be disposed at the outer circumference of the center yoke, which is inside of the armature coil in the radial direction. In this case, the permanent magnets are preferably distributed in at least three positions at the outer perimeter of the axial center yoke, so forming a magnetic circuit between the center yoke and the permanent magnets realizes a magnetic circuit with less magnetic resistance, so higher magnetic flux density can be obtained. Also, assembly and handling is easier as compared with arrangements wherein the permanent magnet is disposed on the outside of the armature coil.

With the voice coil linear actuator according to one embodiment of the present invention, one permanent magnet has a width of Pm in the axial direction, with the magnetic polarity on the outer perimeter side magnetized in the radial direction or approximately radial direction being the N pole, and another permanent magnet having a width of Pm in the axial direction, with the magnetic polarity on the outer perimeter side magnetized in the radial direction or approximately radial direction being the S pole, are disposed on the outer circumference face of the center yoke so as to be alternately in contact one with another in the axial direction, with the widths of the armature coils being equal in the axial direction, the width thereof being Pw, and the distance between the centers of the armature coils adjacent in the axial direction being equal to Pm, such that Pw+Ps≦Pm, wherein Ps denotes a moving stroke. In this case, the moving stroke of the actuator is ensured to be equal to or less than a length obtained by subtracting the width of the armature coil unit from the width of the magnetic pole in the axial direction, and accordingly, the corresponding magnetic pole and armature coil unit move within the opposing axial-direction range. Accordingly, reverse thrust does not occur at any portion of the armature coil units, so great thrust with no waste can be obtained.

With the voice coil linear actuator according to another embodiment of the present invention, a permanent magnet with the magnetic polarity on the outer perimeter side magnetized in the radial direction or approximately radial direction being the N pole, and another permanent magnet with the magnetic polarity on the outer perimeter side magnetized in the radial direction or approximately radial direction being the S pole, are alternately distributed in the axial direction on the perimeter of the center yoke at a pitch of Pm, with the widths of the armature coil units in the axial direction being equal, the width thereof being Pw, the distance between the centers of the armature coils adjacent in the axial direction being equal to Pm, such that Pw+Ps≦Pm, wherein Ps denotes a moving stroke. In this case, the moving stroke of the actuator is ensured to be equal to or less than a length obtained by subtracting the width of the armature coil unit from the pitch interval of adjacent units of the magnetic pole in the axial direction, and accordingly, the corresponding magnetic pole and armature coil unit move within the opposing axial-direction range. Accordingly, reverse thrust does not occur at any portion of the armature coil units, so great thrust with no waste can be obtained.

With the voice coil linear actuator according to the present invention, the armature coil is preferably configured of a coil wire wound on a bobbin which has winding grooves corresponding to three armature coil units at least, and a communicating groove for connecting adjacent armature coil units so that the coil wire can be passed therethrough. In this case, even in the event that at least three armature coil units are provided in the axial direction, the shape of the coil wire is maintained in a constant manner by the bobbin.

With the voice coil linear actuator according to the present invention, the bobbin preferably comprises grooves parallel to the winding groves at portions between the winding grooves that are adjacent in the axial direction. In this case, the weight of the bobbin can be reduced by separately forming grooves parallel to the winding grooves.

With the voice coil linear actuator according to the present invention, the bobbin is may be formed of an insulator. In this case, there are hardly any electromagnetic induction effects on the bobbin itself upon electric current flowing through the coil wire or upon moving of the armature coils, and accordingly, there are hardly any adverse effects due to such electromagnetic induction effects.

With the voice coil linear actuator according to the present invention, the bobbin is may be primarily formed of a conductor, with insulator layers introduced for sectioning the conductor in the axial direction and circumferential direction. In this case, even in the event that the bobbin is formed of a conductor such as aluminum for example, insulating layers for sectioning the conductor in the axial direction and circumferential direction are introduced, so the conducting portions are sectioned into small sections, so that even in the event that there are electromagnetic induction effects on the conductor portions of the bobbin itself upon electric current flowing through the coil wire or upon moving of the armature coils, eddy currents and the like do not readily occur, so adverse effects such as deterioration in driving force and the like can be reduced.

With the voice coil linear actuator according to the present invention, the armature coil may be configured of armature coil units formed of mutually bonded coil wires, and spacers with communicating grooves for connecting adjacent armature coil units so that the coil wires can be passed therethrough, layered alternately. In this case, the portion for supporting the armature coil unit on the inner side can be done away with as compared with arrangements wherein a coil wire is wound on a bobbin, so the number of layers of winding the coil wire can be increased by that much, and accordingly thrust can be increased.

With the voice coil linear actuator according to the present invention, a fixed outer yoke formed of a ferromagnetic material may be disposed on the perimeter of the armature coil, so that the armature coil is movable within the gap formed between the permanent magnet and the outer yoke. In this case, a magnetic circuit with smaller magnetic resistance is formed through the center yoke and the outer yoke, so the magnetic flux density can be increased over arrangements with no outer yoke, and the thrust generated at the armature coil can be made great. Also, the armature coil and the permanent magnet are protected by the outer yoke.

With the voice coil linear actuator according to the present invention, the number of magnetic poles on the permanent magnets, and the number of armature coil units of the armature coil, may be exactly three. In this case, two primary magnetic circuits are formed in the axial direction, so the thrust for moving the armature coil can be increased as compared with conventional arrangements wherein there is only one primary magnetic circuit, and also, the size in the radial diameter can be reduced as compared with conventional arrangements while still generating the same thrust as with conventional arrangements.

A first method according to the present invention, for manufacturing a voice coil linear actuator comprising an armature coil disposed movably in an axial direction, and ring-shaped permanent magnets which have N and S magnetic poles in the radial direction thereof, and are disposed concentrically as to the armature coil, comprises: manufacturing an armature coil by winding a coil wire on a bobbin formed with at least three winding grooves along the perimeter direction thereof for winding the coil wire on the perimeter face thereof, with the winding grooves adjacent in the axial direction being connected by communicating grooves; and assembling the actuator by disposing the armature coil and the permanent magnet such that the coils wound on each winding groove of the armature coil and the permanent magnets face one another in the radial direction, and such that the respective N magnetic poles of the permanent magnets adjacent in the axial direction face in opposite radial directions; wherein, in the armature coil manufacturing step, the coil wire is wound according to the following steps (A) through (G), in which the winding grooves are denoted by 1 through n (wherein n is a positive integer of 3 or more) in order from the winding groove situated at the end-most position;

(A) the coil wire is wound a predetermined odd number of layers at a No. 1 winding groove, and then moves to a No. 2 winding groove through the communicating groove;

(B) in the event that the coil wire has come into the No. k winding groove from the No. k−1 winding groove through the communicating groove, the coil wire is wound a predetermined number of layers one layer or more at the No. k winding groove and then moves on through the communicating groove to the next winding groove, which is the No. k−1 winding groove, in the event that an even number of layers has been wound in the No. k winding groove, and is the No. k+1 winding groove in the event that an odd number of layers has been wound in the No. k winding groove, wherein k is defined by $2 \leq k \leq (n-1)$;

(C) in the event that the coil wire has come into the No. k winding groove from the No. k+1 winding groove through the communicating groove, the coil wire is wound a predetermined number of layers one layer or more at the No. k winding groove and then moves on through the communicating groove to the next winding groove, which is the No. k+1 winding groove, in the event that an even number of layers has been wound in the No. k winding groove, and is the No. k−1 winding groove in the event that an odd number of layers has been wound in the No. k winding groove, wherein k is defined by $2 \leq k \leq (n-1)$;

(D) the coil wire is wound an even number of layers at a No. n winding groove, and then moves to a No. n−1 winding groove through the communicating groove;

(E) in the event that the coil wire is not finished at the No. 1 winding groove, an even number of layers is wound and then the coil wire moves to the No. 2 winding groove through the communicating groove, except in the case of (A);

(F) in the event of finishing the coil wire, the coil wire moves to the No. 1 winding groove following the steps (A), (B), (C), (D), and (E), where an odd number of layers are wound and then the coil wire is completed; and (G) the winding direction is opposite between adjacent winding grooves.

In this case, winding of the coil wire starts at the No. 1 winding groove and the coil wire is wound on another winding groove, following which the winding of the coil wire ends on the No. 1 winding groove, so all of the at least three winding grooves can be wound in a satisfactory manner in the desired winding direction, and also both ends of the coil wire can be aligned at one end in the axial direction of the bobbin. Also, at each winding groove, the winding position of the coil wire is moved while winding the coil wire without exception, so the space of the winding grooves can be utilized to the maximum for winding. Also, the number of winding layers for the winding grooves is normally the same, but in the event that the winding grooves have different depths, the number of winding layers preferably corresponds to the respective depths of the grooves.

A second method according to the present invention, for manufacturing a voice coil linear actuator comprising an armature coil disposed movably in an axial direction, and ring-shaped permanent magnets which have N and S magnetic poles in the radial direction thereof, and are disposed concentrically as to the armature coil, comprises: manufacturing an armature coil by winding a coil wire on a bobbin formed with at least three winding grooves along the perimeter direction thereof for winding the coil wire on the perimeter face thereof, with the winding grooves adjacent in the axial direction being connected by communicating grooves; and assembling the actuator by disposing the armature coil and the permanent magnet such that the coils wound on each winding groove of the armature coil and the permanent magnets face one another in the radial direction, and such that the respective N magnetic poles of the permanent magnets adjacent in the axial direction face in opposite radial directions; wherein, in the armature coil manufacturing step, the coil wire is wound according to the following steps (A) through (G), in which the winding grooves are denoted by 1 through n (wherein n is a positive integer of 3 or more) in order from the winding groove situated at the end-most position;

(A) the coil wire is wound a predetermined odd number of layers at a No. 1 winding groove, and then moves to a No. 2 winding groove through the communicating groove;

(B) in the event that the coil wire has come into the No. k winding groove from the No. k−1 winding groove through the communicating groove, the coil wire is wound a predetermined number of layers one layer or more at the No. k winding groove and then moves on through the communicating groove to the next winding groove, which is the No. k−1 winding groove, in the event that an even number of layers has been wound in the No. k winding groove, and is the No. k+1 winding groove in the event that an odd number of layers has been wound in the No. k winding groove, wherein k is defined by $2 \leq k \leq (n-1)$;

(C) in the event that the coil wire has come into the No. k winding groove from the No. k+1 winding groove through the communicating groove, the coil wire is wound a predetermined number of layers one layer or more at the No. k winding groove and then moves on through the communicating groove to the next winding groove, which is the No. k+1 winding groove, in the event that an even number of layers has been wound in the No. k winding groove, and is the No. k−1 winding groove in the event that an odd number of layers has been wound in the No. k winding groove, wherein k is defined by $2 \leq k \leq (n-1)$;

(D) the coil wire is wound an even number of layers at a No. 1 winding groove and then moves to a No. 2 winding groove through the communicating groove, except in the case of (A);

(E) in the event that the coil wire is not finished at the No. n winding groove, an even number of layers is wound and then the coil wire moves to the No. n−1 winding groove through the communicating groove;

(F) in the event of finishing the coil wire, the coil wire moves to the No. n winding groove following the steps (A), (B), (C), (D), and (E), where an odd number of layers are wound and then the coil wire is completed; and (G) the winding direction is opposite between adjacent winding grooves.

In this case, winding of the coil wire starts at the No. 1 winding groove and the coil wire is wound on another winding groove, following which the winding of the coil wire ends on the No. n winding groove, so all of the at least three winding grooves can be wound in a satisfactory manner in the desired winding direction, and also the two ends of the coil wire can be extended from respective ends in the axial direction of the bobbin in a corresponding manner. Also, at each winding groove, the winding position of the coil wire is moved while winding the coil wire without exception, so the space of the winding grooves can be utilized to the maximum for winding. Also, the number of winding layers for the winding grooves is normally the same, but in the event that the winding grooves have different depths, the number of winding layers preferably corresponds to the respective depths of the grooves.

The parts mounting head according to the present invention comprises: a holding unit formed so as to be capable of holding a part; and a driving unit for driving the holding unit, using the voice coil linear actuator according to the present invention. With the parts mounting head according to the present invention, the driving unit, and thus the parts mounting head, can be reduced in size, and the acceleration and deceleration thereof increased.

The parts assembling apparatus according to the present invention comprises: a parts supply unit upon which supplied parts may be loaded; a parts mounting unit where a supplied article upon which the parts are to be mounted may be loaded; the above-described parts mounting head picks up parts from the parts supply unit and mounts the parts on the article upon which the parts are to be mounted which is loaded on the parts mounting unit; and a head driving unit drives the parts mounting head. With the parts assembling apparatus according to the present invention, the speed of parts mounting actions and the like can be increased.

In addition to the above advantages, with the voice coil linear actuator and manufacturing method thereof according to the present invention, heat generation can also be suppressed. Further features and advantages of the present invention will become more apparent from the following description of embodiments of the invention, with reference to the drawings.

DESCRIPTION OF EMBODIMENTS OF THE INVENTION

The following is a description of details of the present invention, based on embodiments with reference to the drawings.

First Embodiment

Figure 1:
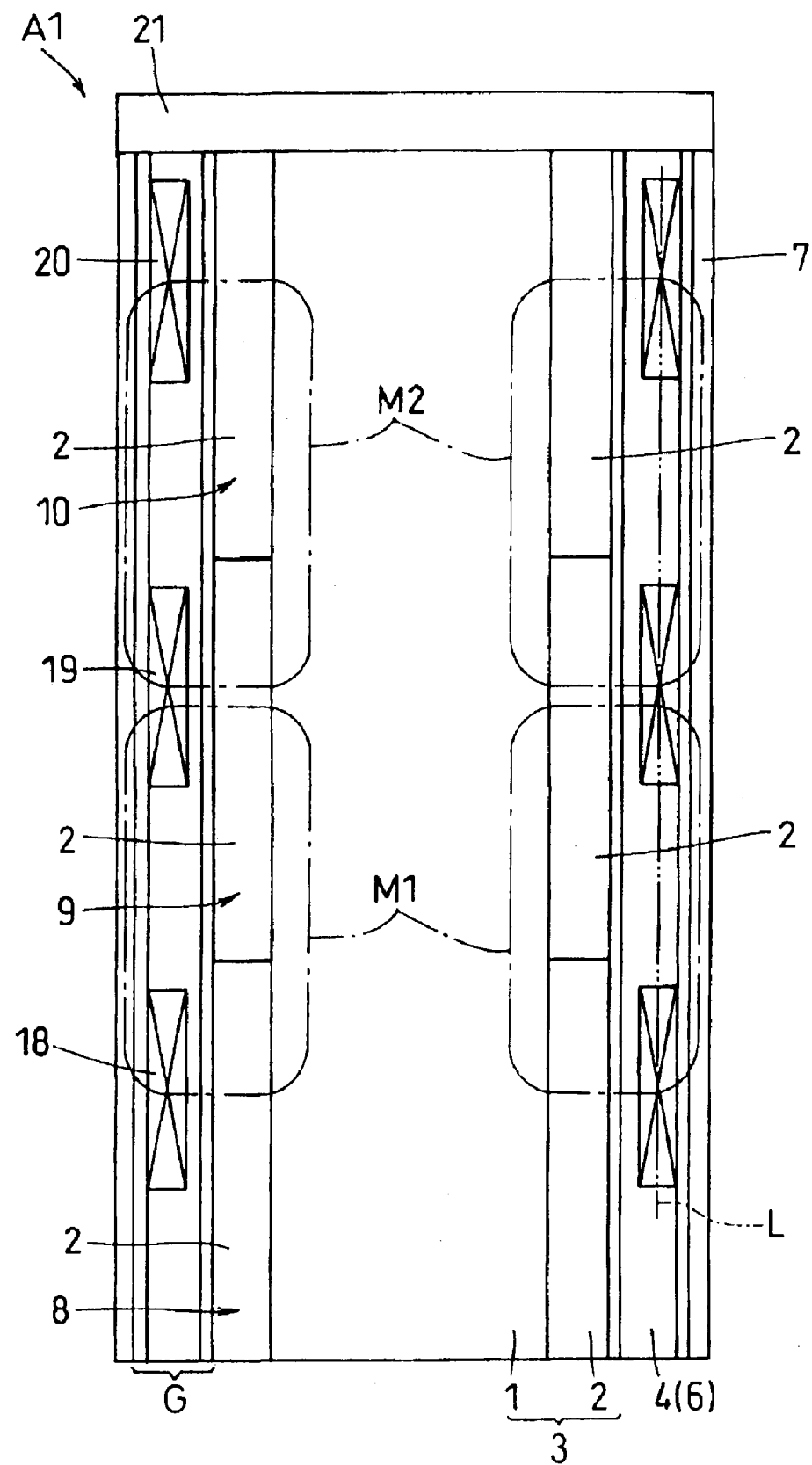
FIG. 1 is a vertical-section view of a voice coil linear actuator according to a first embodiment of the present invention.
Figure 2:
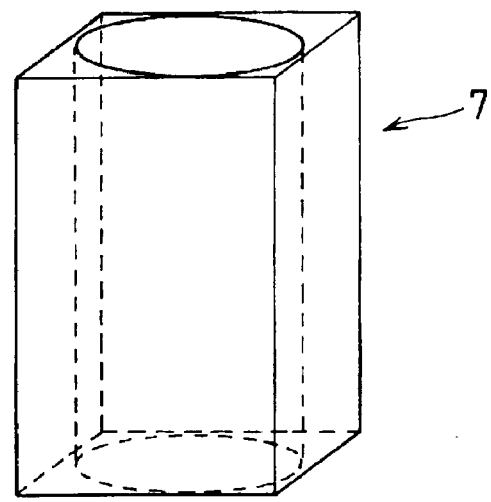
FIG. 2 is a disassembled perspective view of the voice coil linear actuator.
Figure 2:
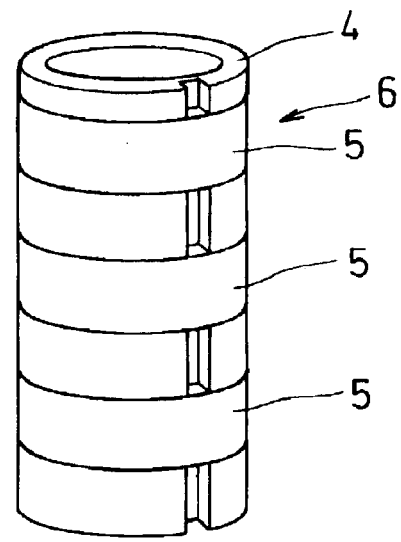
Figure 2:
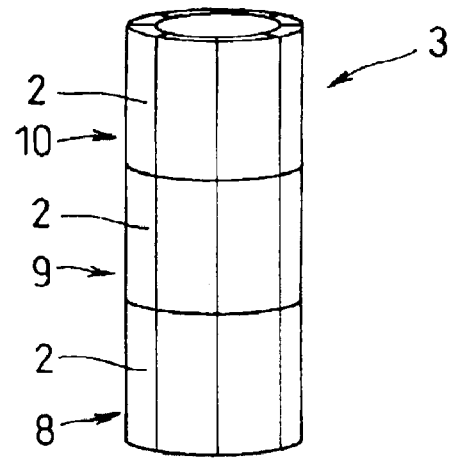
Figure 3:
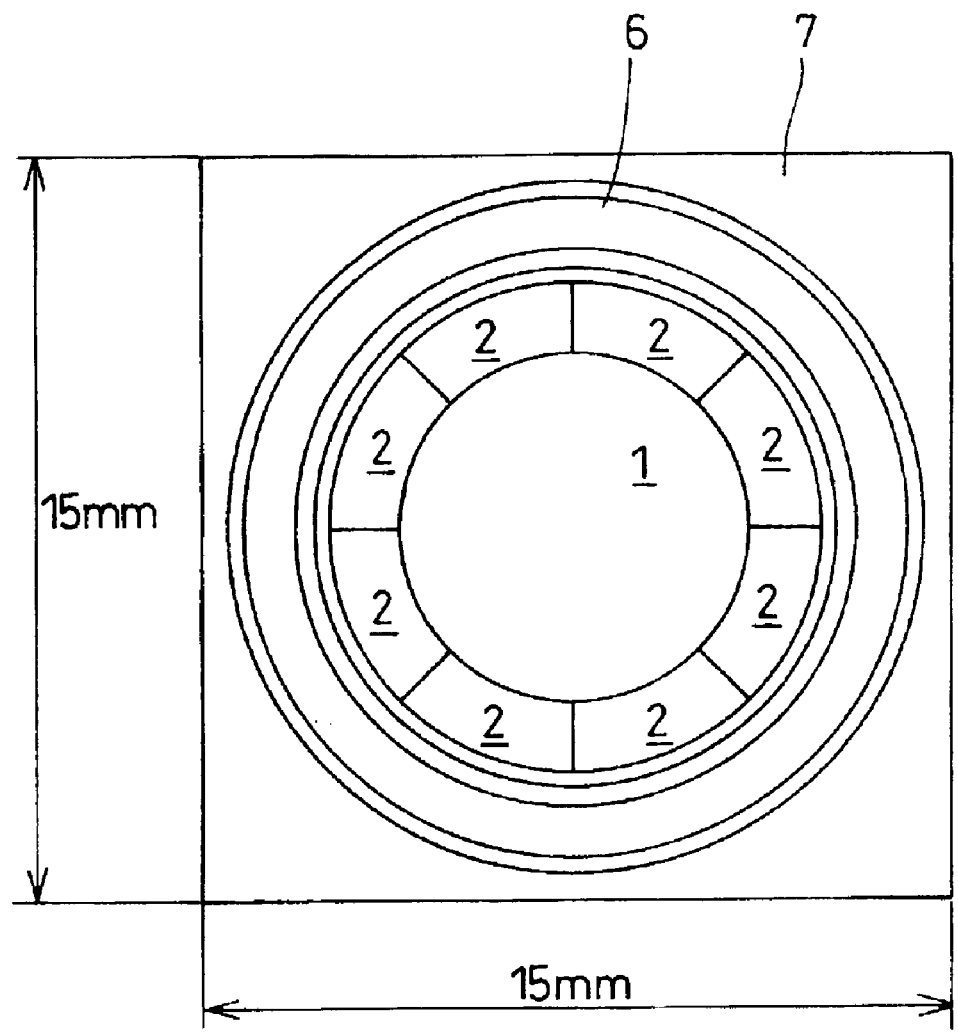
FIG. 3 is a vertical-section view of the voice coil linear actuator.
Figure 4:
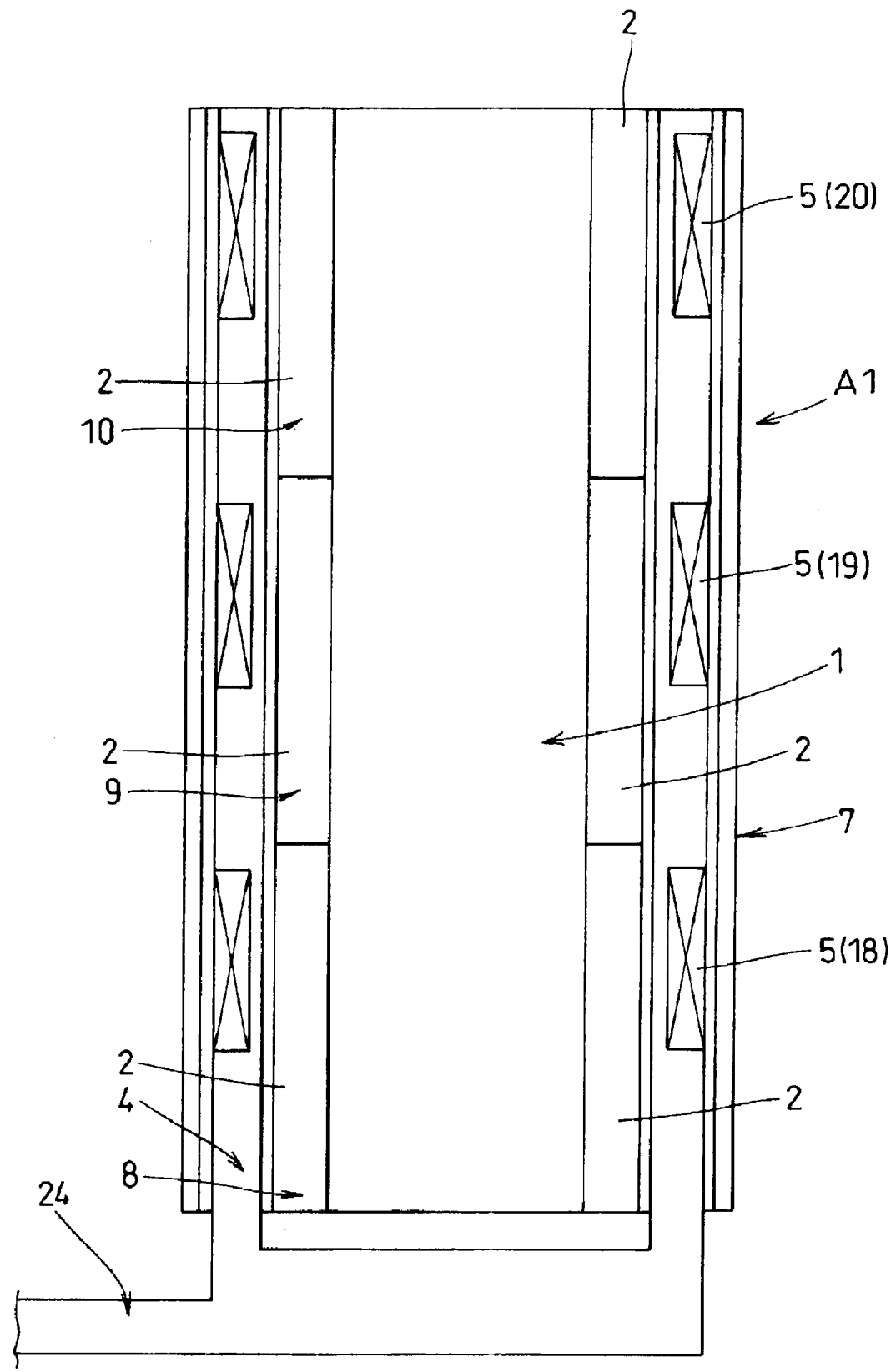
FIG. 4 is a vertical cross-sectional view of the voice coil linear actuator with a linking member linked.
Figure 5:
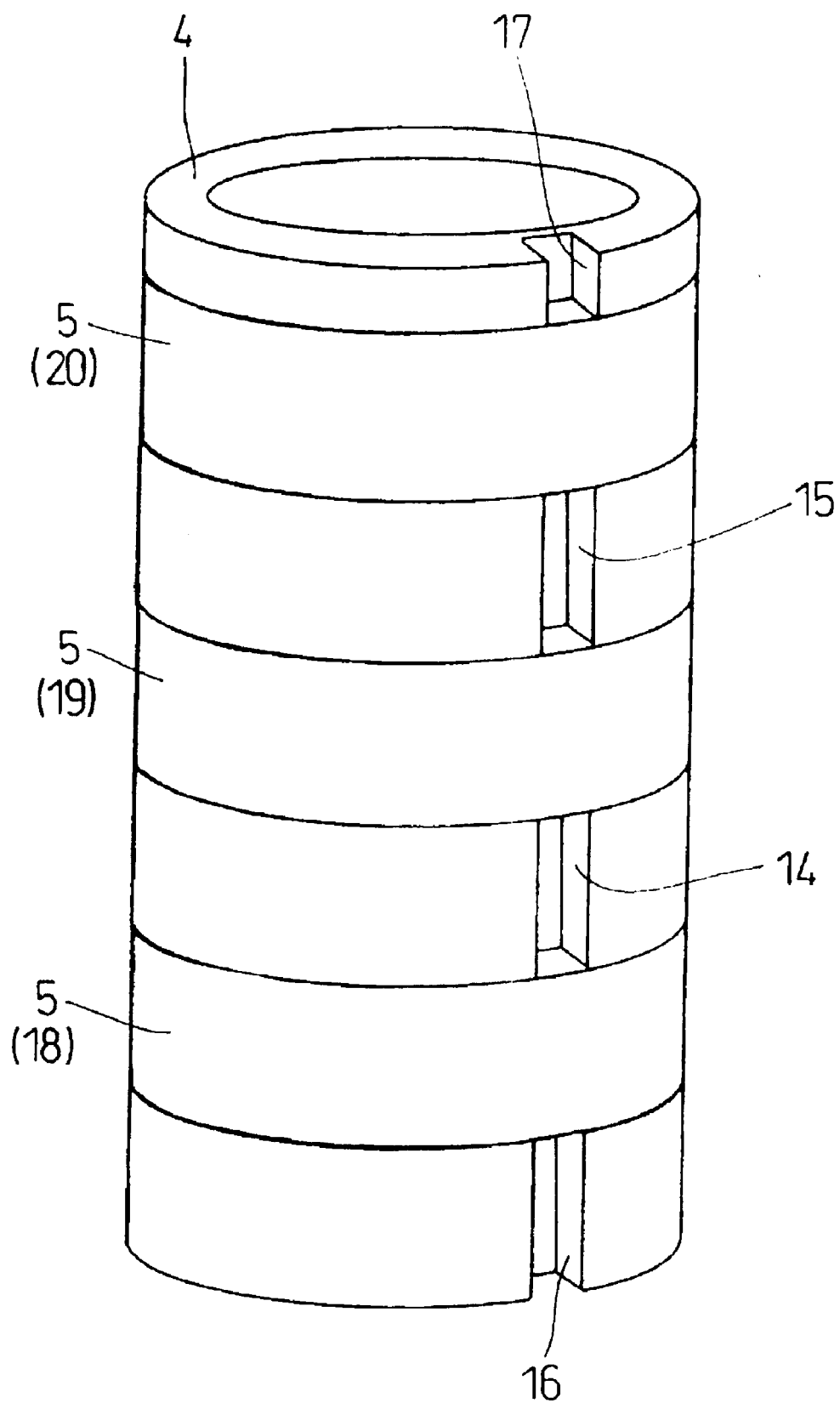
FIG. 5 is a perspective view of an armature coil with a coil wire wound.
Figure 6:
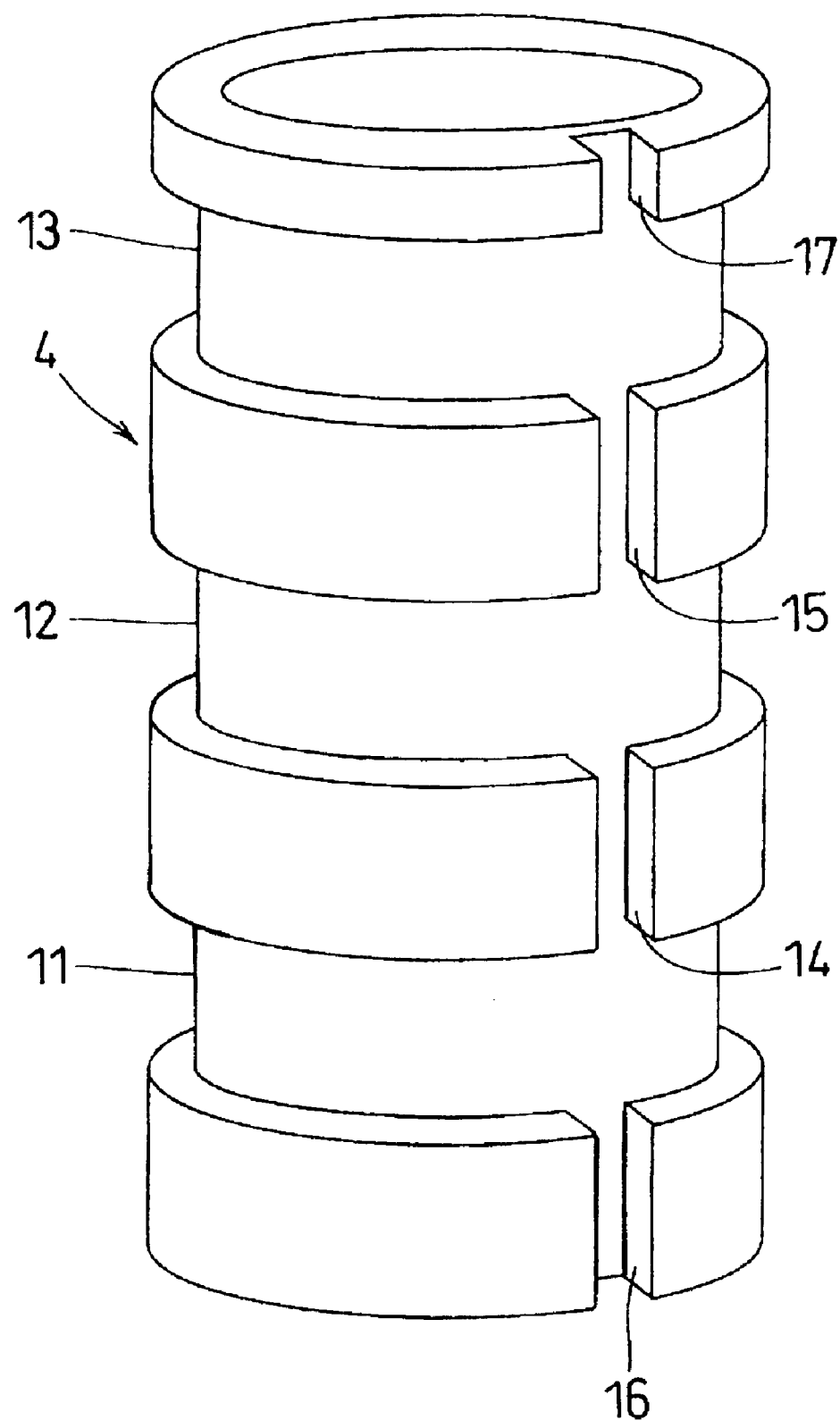
FIG. 6 is a perspective view of a bobbin.
Figure 7A:
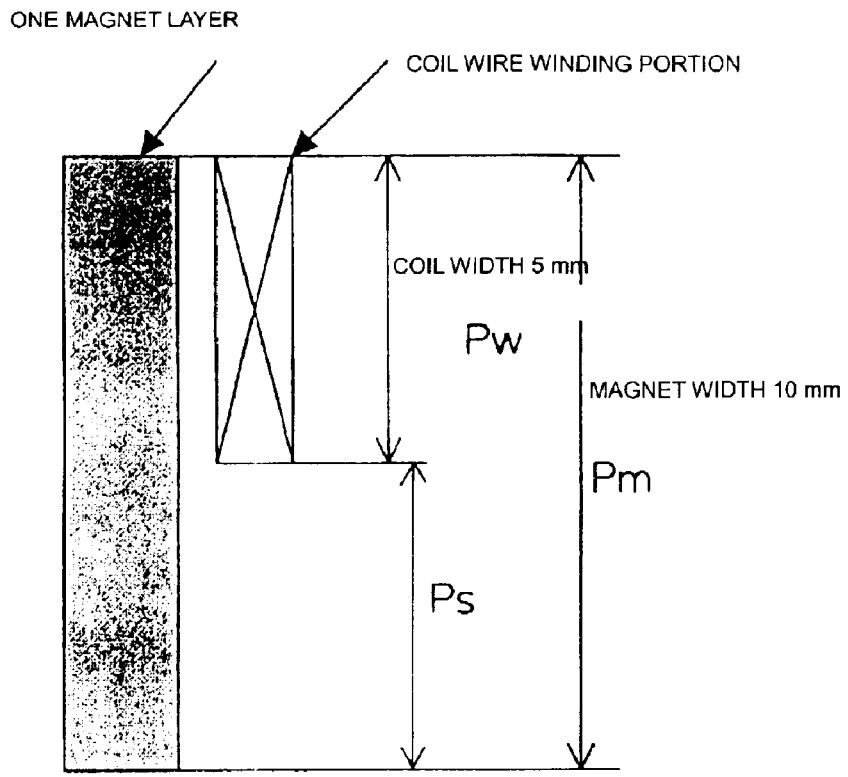
FIGS. 7A and 7B are a cross-sectional views illustrating the positional relation between the magnet and armature coil unit formed of coil wire.
Figure 7B:
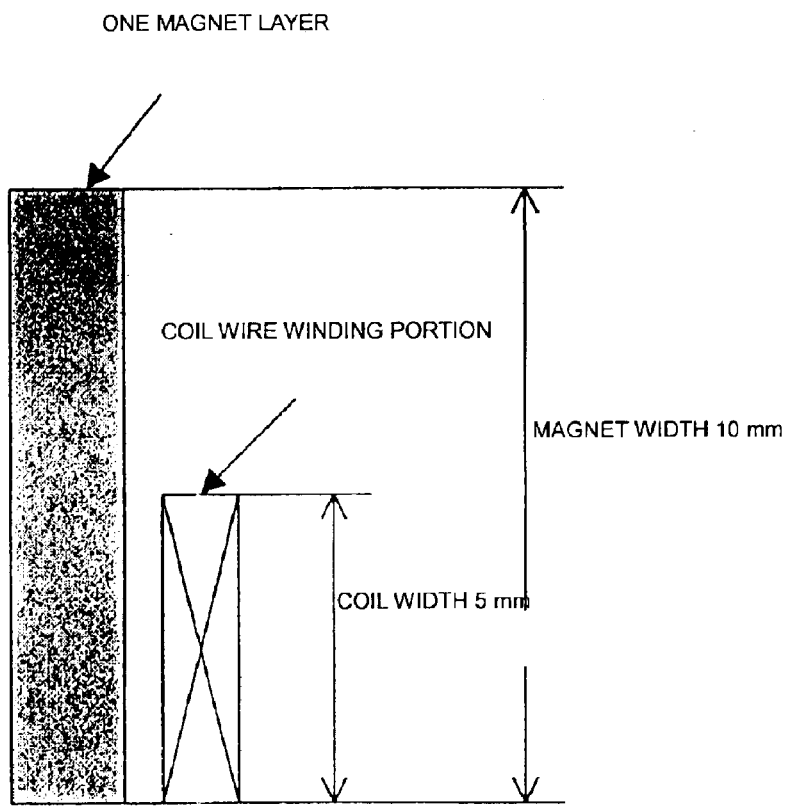
Figure 8:
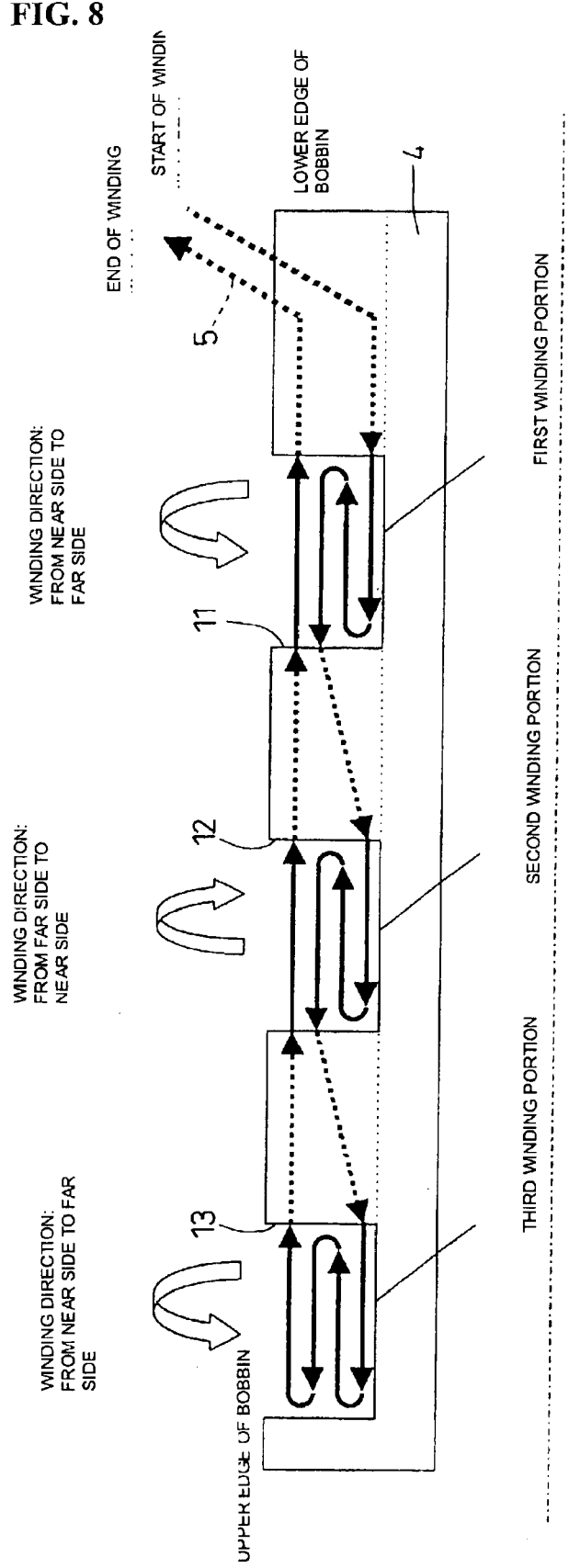
FIG. 8 is an explanatory diagram illustrating the process for winding the coil wire onto the bobbin.
Figure 9:
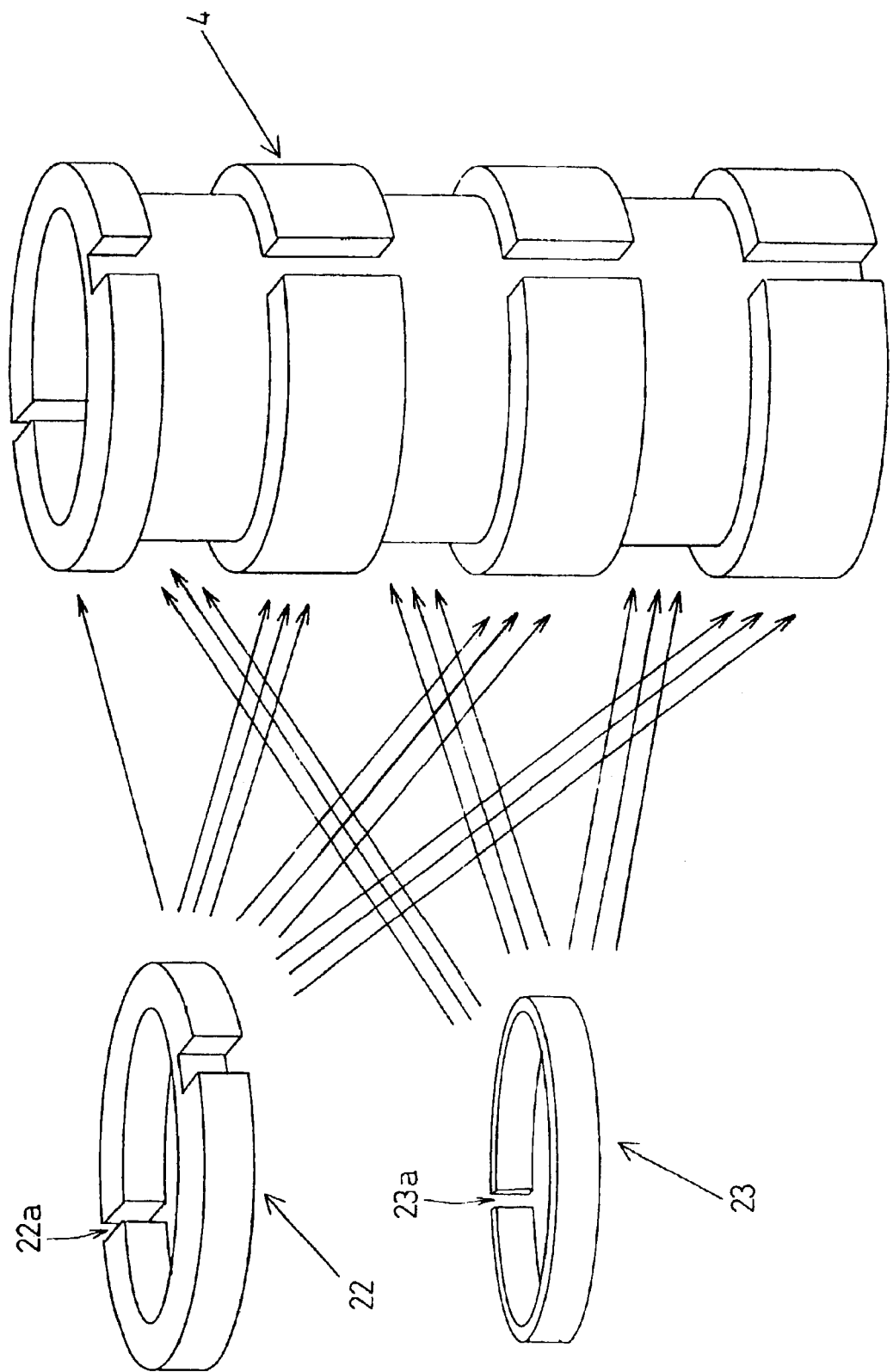
FIG. 9 is a perspective view of a modification of a bobbin.
Figure 10:
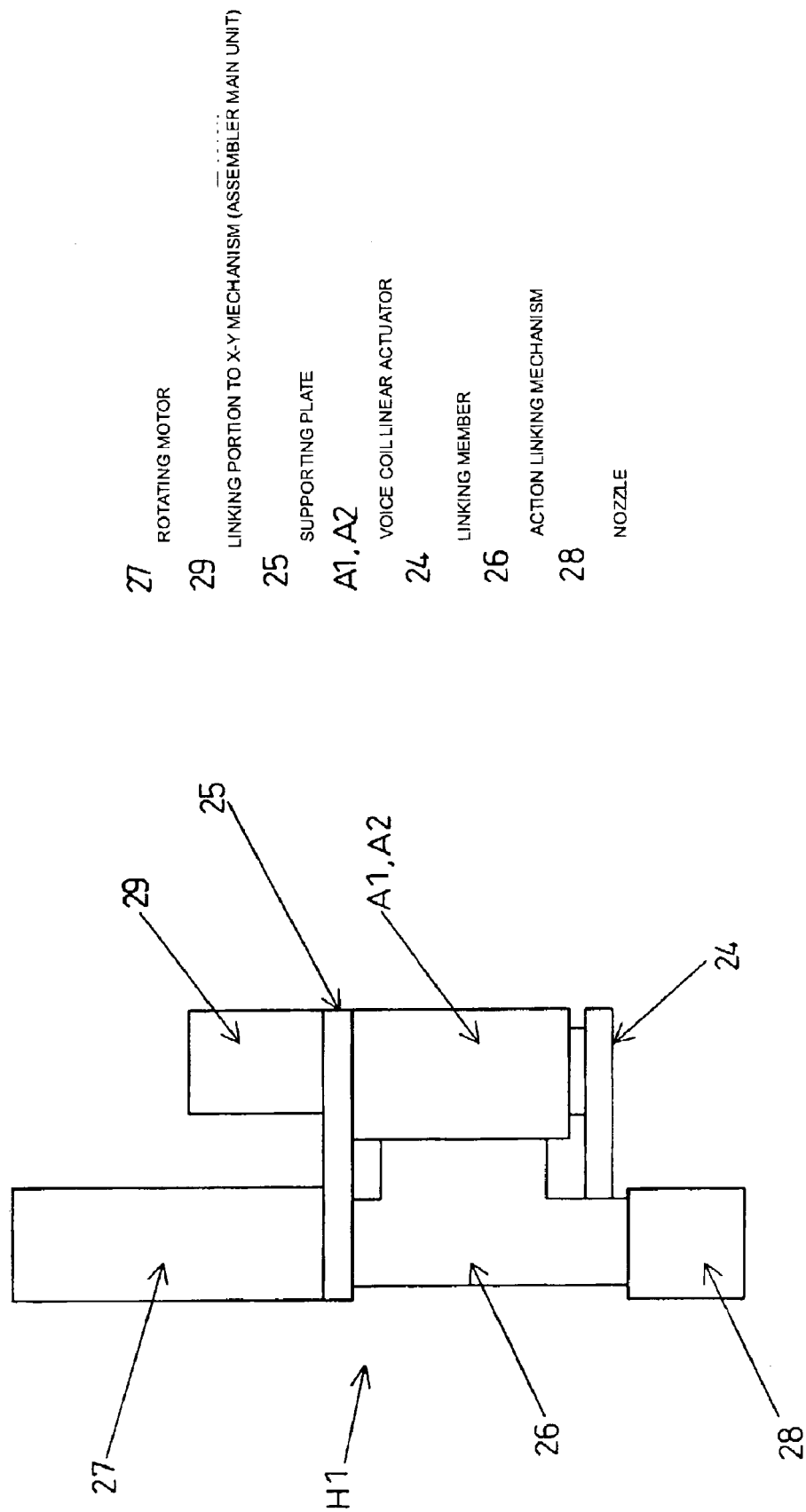
FIG. 10 is a schematic side view illustrating a mounting head.
Figure 20:
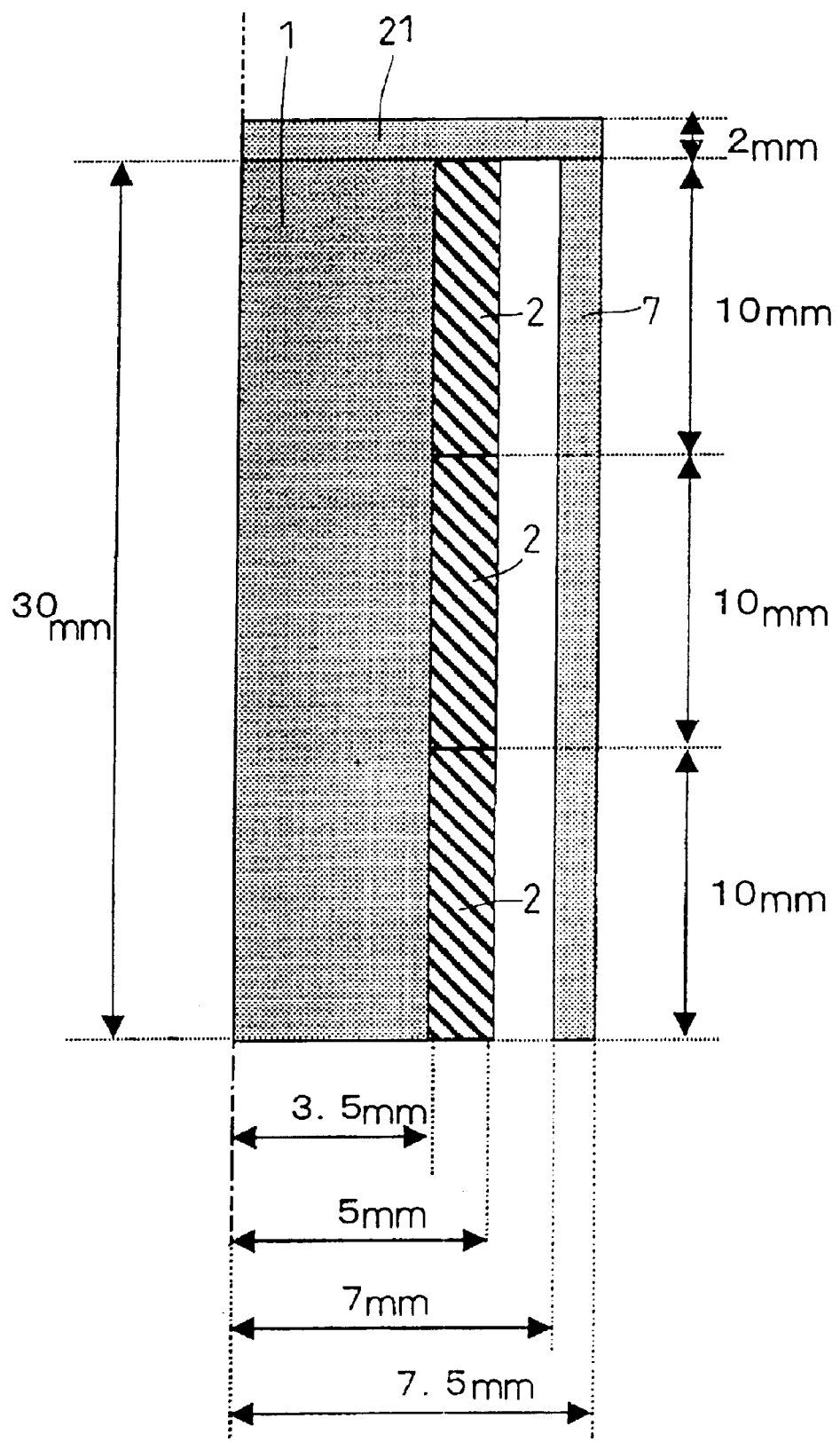
FIG. 20 is a schematic vertical-sectional diagram illustrating one half of a voice coil linear actuator according to the first embodiment of the present invention and the dimensions thereof.

FIGS. 1 through 10 and FIG. 20 illustrate a first embodiment. FIG. 1 is a vertical-section view of a voice coil linear actuator according to a first embodiment of the present invention, FIG. 2 is an exploded perspective view of the voice coil linear actuator, FIG. 3 is a cross-sectional view of the voice coil linear actuator, FIG. 4 is a vertical-section view of the voice coil linear actuator with a linking member linked, FIG. 5 is a perspective view of an armature coil with a coil wire wound, FIG. 6 is a perspective view of a bobbin, FIGS. 7A and 7B are a cross-sectional views illustrating the positional relation between the magnet and armature coil unit formed of coil wire, FIG. 8 is an explanatory diagram illustrating the process for winding the coil wire onto the bobbin, FIG. 9 is a perspective view of a modification of a bobbin, and FIG. 10 is a schematic side view illustrating a mounting head. Also, FIG. 20 is a schematic vertical-sectional diagram illustrating one half of a voice coil linear actuator according to the first embodiment of the present invention and the dimensions thereof.

First, the configuration of the voice coil linear actuator A1 will be described. As shown in FIG. 1, the voice coil linear actuator A1 is configured of a center stator 3, an armature coil 6, and an outer yoke 7.

In detail, the armature coil 6, comprising a bobbin 4 formed of an aluminum alloy and a coil wire 5 wound thereupon, is fitted around the center stator 3 so as to surround it. Further, an outer yoke 7 formed of a ferromagnetic material such as iron or iron-cobalt alloy or the like is fitted around the armature coil 6.

The center stator 3 has a center yoke 1 with a cylindrical shape (axial shape) 7 mm in diameter, formed of a ferromagnetic material such as iron or iron-cobalt alloy or the like. Multiple permanent magnets 2 are bonded and fixed to the outer perimeter of the center yoke 1 at predetermined positions. Each of the permanent magnets 2 is formed of a rare-earth metal magnet with a thickness of 1.5 mm in the radial direction, and is shaped as an arc-like plate for covering ⅛ of a circle in the circumferential direction, as described later. A total of eight of the permanent magnets 2 are arranged in a ring-shaped manner on the perimeter of the center yoke 1, and there are three sets thereof, positioned at three positions in the axial direction for a total of 24 permanent magnets 2. There are no gaps between adjacent permanent magnets 2, neither circumferentially nor axially, with all being in contact one with another.

The center stator 3 and the outer yoke 7 are connected by a plate-shaped bottom yoke 21 at one end in the axial direction, thereby integrating the center stator 3 and the outer yoke 7. This bottom yoke 21 is formed of a ferromagnetic material such as iron or iron-cobalt alloy or the like.

The armature coil 6 is movable in the axial direction within the gap G which is a gap between the center stator 3 and the outer yoke 7.

The center stator 3 is configured such that opposite magnetic poles are alternately manifested in the axial direction by the ring-shaped permanent magnets 2 arrayed in the axial direction. Each of the permanent magnets 2 forming the first magnetic pole 8 have an arc-like plate shape of a cylinder being split into eighths. The permanent magnets 2 of the first magnetic pole 8 have been subjected to one-dimensional magnetization such that a magnetic field is generated in an arc-like shape from the outer circumference side toward the inner circumference side. Bonding eight of such permanent magnets 2 on the outer perimeter of the center yoke 1 so as to form a ring creates a magnetic pole wherein the outer surface face magnetized in the general radial direction becomes the S pole. The width of the magnetic pole in the axial direction of this first magnetic pole 8 is set so as to be 10 mm, as shown in FIG. 20.

The second magnetic pole 9 is also formed of eight permanent magnets 2 bonded in a ring shape, adjacent to the first magnetic pole 8. The direction of magnetization thereof is opposite to that of the first magnetic pole 8, so a magnetic pole wherein the outer surface side is the N pole is formed. The width of the magnetic pole in the axial direction of this second magnetic pole 9 is also set so as to be 10 mm.

A third magnetic pole 10 is also formed of eight permanent magnets 2 bonded in a ring shape, adjacent to the second magnetic pole 9. The direction of magnetization thereof is the same as that of the first magnetic pole 8, so a magnetic pole wherein the outer surface side is the S pole is formed. The width of the magnetic pole in the axial direction of this third magnetic pole 10 is also set so as to be 10 mm.

The armature coil 6 is formed as shown in FIG. 5. The bobbin 4 making up the armature coil 6 is shown in FIG. 6. The bobbin 4, formed of aluminum alloy in the general shape of a cylinder having a bottom, has three winding grooves 11, 12, and 13, each of a width of 5 mm and depth of 1 mm, at a pitch of 10 mm. The winding grooves 11, 12, and 13 correspond to the magnetic poles 8, 9, and 10 of the center stator 3. A coil wire 5 is wound onto the winding grooves 11, 12, and 13. The adjacent winding grooves 11, 12, and 13 are mutually connected by communicating grooves 14 and 15 which are each 1 mm in width and 1 mm in depth. The communicating grooves 14 and 15 allow one coil wire 5 to be continuously wound on the winding grooves 11, 12, and 13 of the bobbin 4. Accordingly, winding the coil wire 5 on the winding grooves 11, 12, and 13 respectively forms a first armature coil unit 18, second armature coil unit 19, and third armature coil unit 20. Also, communicating grooves 16 and 17 which are each 1 mm in width and 1 mm in depth are provided between the first winding groove 11 and the bottom of the bobbin, and the third winding groove 13 and the top of the bobbin. The communicating grooves 16 and 17 allow the coil wire 5 to be externally extended without interfering with the outer yoke 7.

The direction of winding the coil wire of the second armature coil unit 19 is opposite to that for the first and third armature coil units 18 and 20. Accordingly, the direction of force generated when applying electric current to each is aligned. That is to say, the armature coil units 18, 19, and 20, and the magnetic poles of the magnets which they face, are aligned in a constant direction with regard to the relation of generating force.

Also, the maximum stroke of this actuator A1 is 5 mm. That is to say, for a given pole, at the upper end of the stroke, the positional relation between the magnet 2 and the armature coil unit is as shown in FIG. 7A, and at the bottom end of the stroke, the positional relation between the magnet 2 and the armature coil unit is as shown in FIG. 7B. That is, if the axial direction width of the armature coil unit is Pw, the axial direction width of the magnet 2 is Pm, and the stroke of the actuator A1 is Ps, the relationship of Pw+Ps≦Pm holds.

FIGS. 1, 3, and 4 illustrate cross-sectional view of the actuator A1. The thickness of the metal making up the bobbin 4 is 0.4 mm at the positions of the winding grooves 11, 12, and 13, and the communicating grooves 14 through 17, and is 1.4 mm at other portions. The gaps between the bobbin 4 and the magnet 2, and the bobbin 4 and the outer yoke 7, are 0.3 mm each, with the magnetic circuit gap G (the distance from the outer diameter of the magnet to the inner diameter of the outer yoke) being 2 mm.

Also, the figures for the coil wire 5 used are as follows. Diameter of conductor, 0.2 mm; thickness of coating, 0.008 mm; length, 10.7 m; resistance, 6.2 Ω; and number of turns, approximately 270. Applying a DC current to the coil wire 5 with such a configuration causes current to flow in opposite directions in respective pairs of adjacent armature coil units 18, 19, and 20, in the axial direction.

On the other hand, as indicated in FIG. 1 by the broken line, two magnetic circuits are formed in the axial direction due to the permanent magnet 2, a magnetic circuit M1 wherein lines of magnetic force pass through the first magnetic pole 8, center yoke 1, second magnetic pole 9, second armature coil unit 19, outer yoke 7, and first armature coil unit 18, and another magnetic circuit M2 wherein lines of magnetic force pass through the third magnetic pole 10, center yoke 1, second magnetic pole 9, second armature coil unit 19, outer yoke 7, and third armature coil unit 20. Thus, thrust for moving the armature coil 6 in the axial direction is generated at both magnetic circuits M1 and M2.

Also, while not shown, a magnetic circuit wherein lines of magnetic force pass through the third armature coil unit 20, outer yoke 7, bottom yoke 21, center yoke 1, and third magnetic pole 10, is also a magnetic circuit created by the permanent magnet 2.

Also, the second embodiment according to the present invention which will be described later, and the magnetic circuits M1 and M2 illustrated regarding the modifications of the voice coil linear actuator according to the present invention are also magnetic circuits created by the permanent magnet 2.

The electric current flowing through the armature coils 18, 19, and 20, and the lines of magnetic force generated by the magnetic poles 8, 9, and 10, generate thrust proportional to the electric current at the armature coil 6.

The details of winding the coil wire 5 on the bobbin 4 of the armature coil 6 are as shown in FIG. 8. Note that FIG. 8 shows half of a cut-away bobbin 4. The following is the winding method.

(a) The coil wire 5 is introduced from around the bottom of the bobbin 4 through the communicating groove 16, to the first winding groove 11.

(b) Subsequently, the coil wire 5 is wound on the first winding groove 11 so as to form three layers in the radial direction (the winding direction at this time is the forward direction).

(c) Subsequently, the coil wire 5 moves to the second winding groove 12 through the communicating groove 14, and the coil wire 5 is wound so as to form three layers in the radial direction in a winding direction opposite to that on the first winding groove 11.

(d) Subsequently, the coil wire 5 moves to the third winding groove 13 through the communicating groove 15, and is wound so as to form four layers in the radial direction in the forward winding direction.

(e) Subsequently, the coil wire 5 moves to the second winding groove 12 again through the communicating groove 15, and is wound so as to form one more layer in the radial direction in the reverse winding direction.

(f) Subsequently, the coil wire 5 moves to the first winding groove 11 through the communicating groove 14, and is wound so as to form one more layer in the radial direction in the forward winding direction.

(g) Subsequently, the remainder of the coil wire 5 is extended from around the bottom of the bobbin 4 though the communicating groove 16, thereby ending the winding process.

The width of the winding grooves 11, 12, and 13 is 5 mm, and the coil wire diameter is around 0.22 mm, so each groove can be wound 22 to 23 times per layer. Upon following winding one layer, the winding moves to the layer which is outwards in the radial direction, and makes a turnback and continues winding. Accordingly, in the event of winding an even number of layers in the radial direction, the coil wire returns to the side of the groove from which the winding began, and in the event of winding an odd number of layers in the radial direction, the coil wire goes to the side opposite to the side of the groove from which the winding began. Accordingly, winding as shown in FIG. 8 allows four layers to be wound in the radial direction on each of the first through three winding grooves 11 through 13, and the position for starting the overall winding and the position for ending the overall winding to be made the same. This means that the position where the wire enters and exits the armature coils is the same, so the wiring is neat and orderly. Also, the space in the wiring grooves can be utilized to the maximum in winding the coil wire. Note that the communicating groove 17 between the third winding groove 13 and the top of the bobbin 4 is not used here, but may be used to extend the winding from the top of the bobbin.

Also, though not shown in the drawings, a coil wire 5 with a rectangular cross-sectional shape may be used. In this case, the coil wire 5 can be wound on the winding grooves 11 through 13 with no gaps. This allows the cross-sectional area of the coil wire to be substantially increased, so the electric resistance on the coil wire decreases. Accordingly, even in the event that the current flowing through the magnetic field of the permanent magnet 2 is increased to a certain extent to increase the thrust being generated, the amount of heat generated is not increased.

Following winding, the outer perimeter of the armature coil 6 is protected with a thin heat-resistant tape around 30 μm thick, to keep the shape of the coil wire 5. Accordingly, the wound portions do not unravel from around the extended portions of the coil wire 5.

The bobbin 4 has been formed of an aluminum alloy here, and due to the bobbin 4 being a conductor, a current is generated within the bobbin 4 at the time of the coil current changing due to mutual inductance, thereby generating reverse thrust. Also, at the time of the bobbin 4 moving the bobbin 4 crosses the magnetic field generated by the permanent magnets 2, thereby generating an eddy current in the bobbin 4. Thus, thrust in the direction opposite to the direction in which the bobbin 4 is proceeding is generated. In order to prevent this, the bobbin 4 may be configured of an insulator such as resin or the like with high insulating properties, or a bobbin 4 formed of a conductor may have insulating portions therein.

A specific example of the configuration of the bobbin 4 having insulating portions is shown in FIG. 9. That is, the bobbin 4 comprises a great number of ring-shaped pieces 22 and 23 formed of aluminum alloy, layered one upon another in a predetermined order in the axial direction. The ring-shaped pieces 22 and 23 are formed of aluminum alloy, and have insulating plating on the surface thereof. Also, slits 22a and 23a insulating in the circumferential direction are provided to the ring-shaped pieces 22 and 23, and the slits 22a and 23a serve as insulating structures in the circumferential direction. A great number of the ring-shaped pieces 22 and 23 are layered and bonded to form the bobbin 4. The ring-shaped pieces 22 form the portions having the communicating grooves 14, 15, 16, and 17. The ring-shaped pieces 23 form the winding grooves 11, 12, and 13.

In this way, the members formed of conductor which make up the bobbin 4 are insulated in the axial direction and the circumferential direction, whereby eddy currents generated in the bobbin 4 do not flow between the ring-shaped pieces 22 and 23, and accordingly are suppressed. On the other hand, the bobbin 4 is formed of aluminum alloy with excellent thermal conduction properties, and accordingly is advantageous for thermal discharge. Accordingly, a voice coil linear actuator more effective for moving the armature coil can be obtained.

Also, in the event that extremely fast responsivity is required, a thin film formed of a conductor with little resistivity such as copper or the like, or a cylindrical short coil formed of a thin plate formed of a conductor, may be placed on the inner circumferential face of the outer yoke or the outer perimeter of the center stator.

The thrust generated at the armature coil 6 is transmitted to the load by the linking member 24 linked at the bottom portion of the armature coil 6 as shown in FIG. 4, with the movement thereof being supported by an unshown linear guide. Also, the stroke is detected by a linear scale and linear encoder (not shown) provided separately. Obtaining feedback of these signals to control the coil current allows the actuator to be controlled to a desired position. Note that the bottom yoke 21 connecting the center stator 3 and the outer yoke 7 at the top is not shown in FIG. 4.

A specific example of a parts assembly apparatus wherein the voice coil linear actuator A1 according to the first embodiment of the present invention has been installed will be described in brief.

Figure 32:
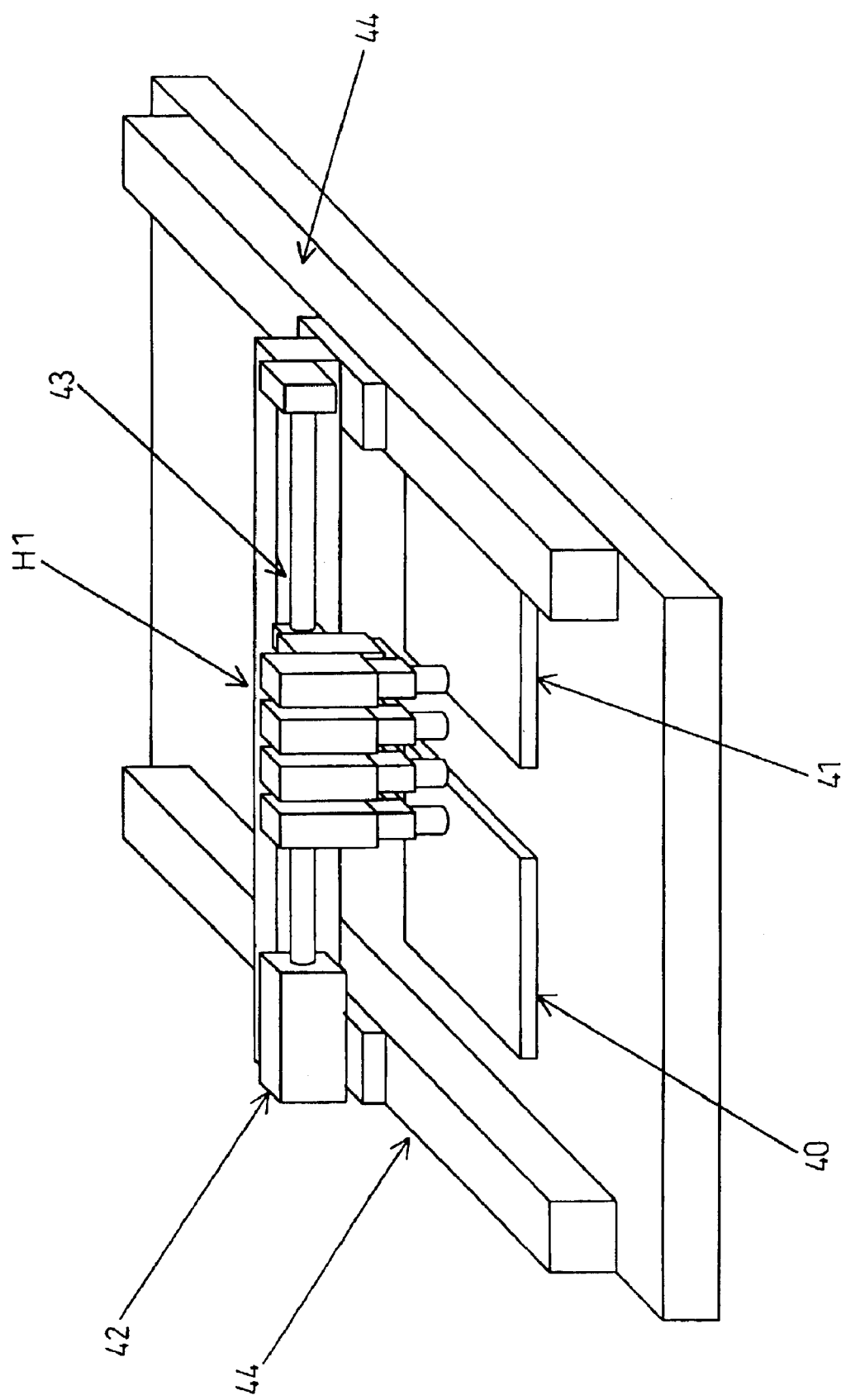
FIG. 32 is a schematic perspective view illustrating an example of a parts assembly apparatus.
Figure 33:
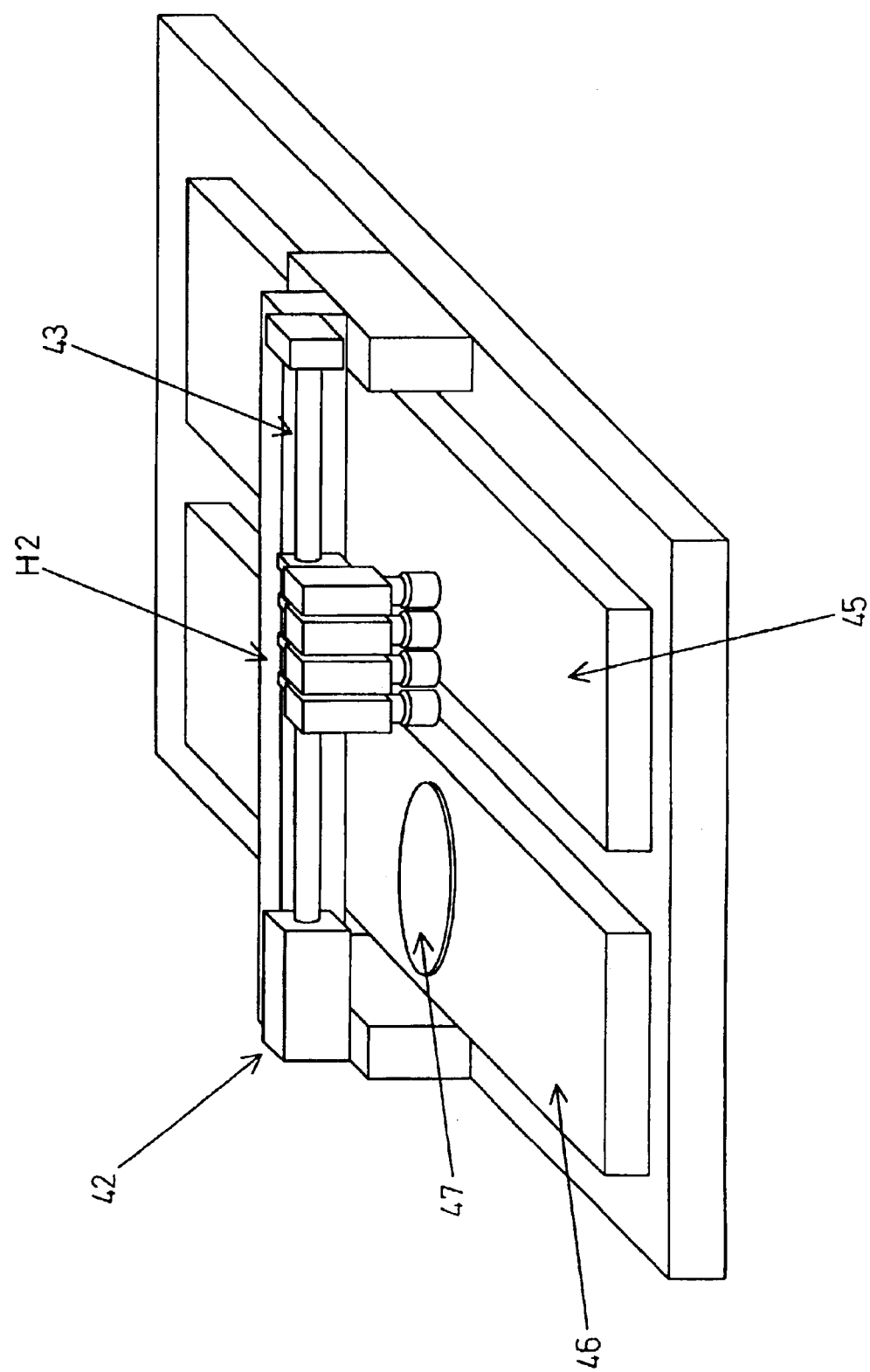
FIG. 33 is a schematic perspective view illustrating another example of a parts assembly apparatus.

FIGS. 32 and 33 each illustrate an example of a parts assembly apparatus for mounting electronic parts to packages or boards or the like, for example. See also FIG. 10.

The parts assembly apparatus shown in FIG. 32 has a supply board 40 for supplying electronic parts loaded thereupon in a matrix-like formation, and an assembly board 41 upon which are loaded packages or small boards or the like in a matrix-like formation, side by side on a base. Mounting heads H1 for mounting, extracting the parts from the supply board 40, and mounting onto the package or the like on the assembly board 41, are provided so as to be movable in the X-Y axial directions. The arrangement shown in FIG. 32 has four mounting heads H1 arrayed in the Y-axial direction, with the mounting heads H1 being movable in the Y-axial direction by a servo motor 42 and ball screw 43. Also, the mounting heads H1 can move in the X-axial direction by a pair of linear motors 44. Movement in the vertical, i.e., the Z-axial direction, of the nozzles 28 for suctioning parts and so forth, is performed by the above-described voice coil linear actuator A1.

The parts assembly apparatus shown in FIG. 33 has, on a base thereof, a supply side moving stage 45 upon which are loaded electronic parts in a matrix-like formation, and is capable of moving in the X-axial direction, and a mounting side moving stage 46 upon which are loaded packages or small circuits or the like, and is capable of moving in the X-axial direction, with four mounting heads H2 for extracting parts from the supply side moving stage 45 and mounting to the package or the like on the mounting side moving stage 46 being disposed above the stages 45 and 46 by a gate-shaped supporting member. With the parts assembly apparatus shown in FIG. 33, four mounting heads H2 are arrayed in the Y-axial direction, with the mounting heads H2 being movable in the Y-axial direction by a servo motor 42 and ball screw 43. Movement in the Z-axial direction of the nozzles 28 for suctioning parts and so forth for the mounting heads H2 is performed by the above-described voice coil linear actuator A1. Also, the mounting side moving stage 46 has a rotating stage 47 enabling changing of the direction of the parts and so forth.

FIG. 10 illustrates an example of the parts mounting heads H1 and H2 provided to the parts assembly apparatuses such as shown in FIGS. 32 and 33. In FIG. 10, the mounting head H1 is shown. This parts mounting head H1 comprises the voice coil linear actuator A1, and the details thereof are described below.

The outer yoke 7 and center stator 3 of the voice coil linear actuator A1 are fixed to a supporting plate 25, and as shown in FIG. 10, the vertical movement of the armature coil 6 is extracted by a linking member 24, and transmitted to an action linking mechanism 26. At the action linking mechanism 26, the vertical motion of the armature coil 6 of the voice coil linear actuator A1 and the rotary motion of a rotating motor 27 are synthesized. Also, air tubes (not shown) for suctioning parts are introduced, so that the motion of the mechanism and the suction pressure are transmitted to the nozzle 28. Also, the parts mounting head H1 is linked to an unshown X-Y mechanism of the main unit by a linking portion 29.

FIG. 4 illustrates the linking portion between the voice coil linear actuator A1 and the linking member 24. The bottom of the bobbin 4 making up the armature coil 6 and the linking member 24 are linked, so that the vertical motion of the armature coil 6 within the magnetic gap G defined by the center stator 3 and the outer yoke 7 is transmitted to the linking member 24.

The position of the armature coil 6 of the voice coil linear actuator A1 is measured by a linear encoder (not shown), and is positioned at an optional position by feedback control. Also, following placing the part on the mounting board, controlling the value of the current applied to the armature coil provides an optional pressing force.

Also, in the event that the electric power source is off, the armature coil 6 is held at the upper end of the stroke by a spring (not shown). The force of the spring pulling upwards is the minimal force required for overcoming the weight of the moving unit and frictional force, so the voice coil linear actuator Al can move without being impeded by the spring.

Second Embodiment

Figure 11:
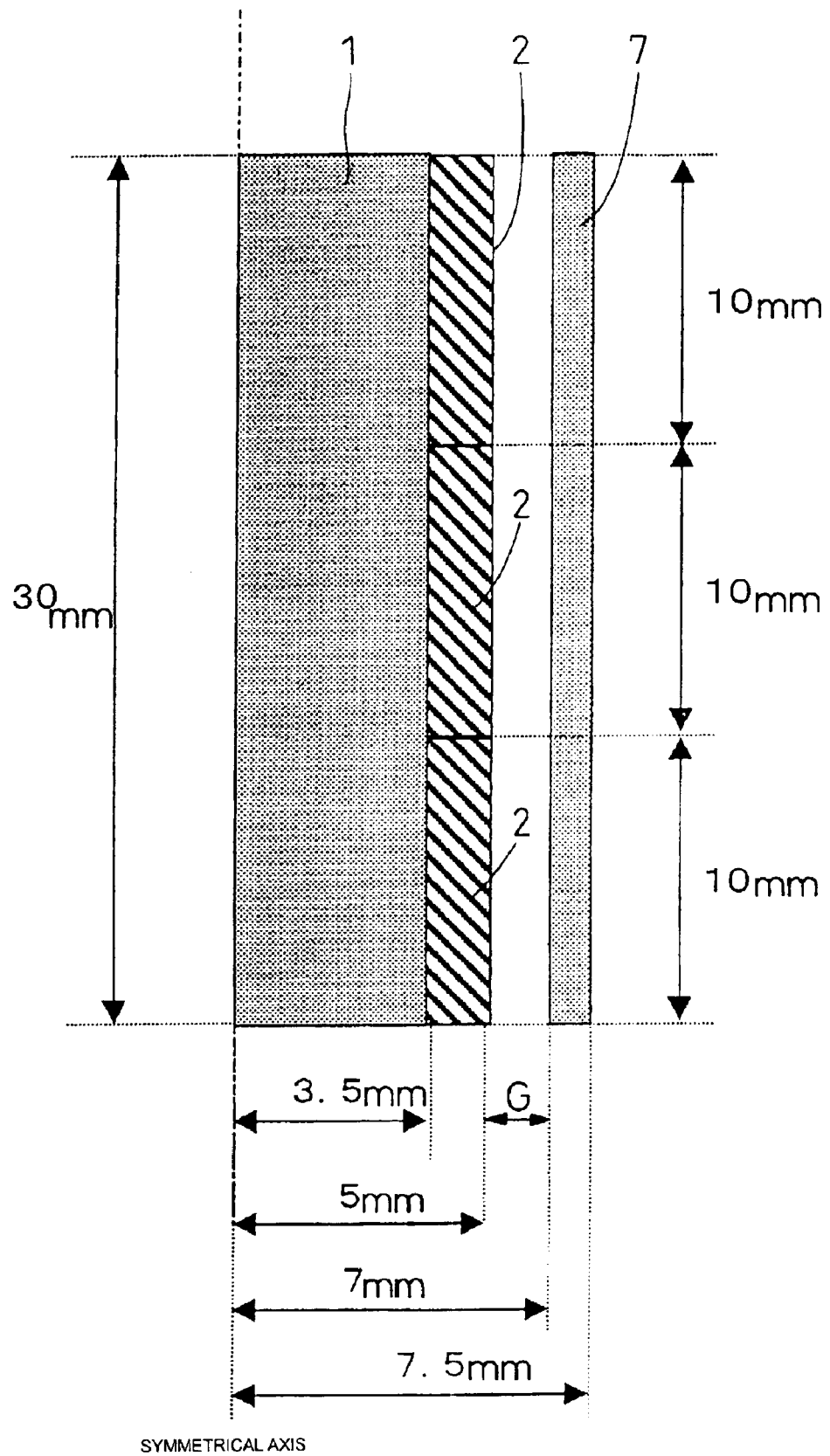
FIG. 11 is a schematic vertical-sectional diagram illustrating one half of a voice coil linear actuator according to a second embodiment of the present invention and the dimensions thereof.
Figure 12:
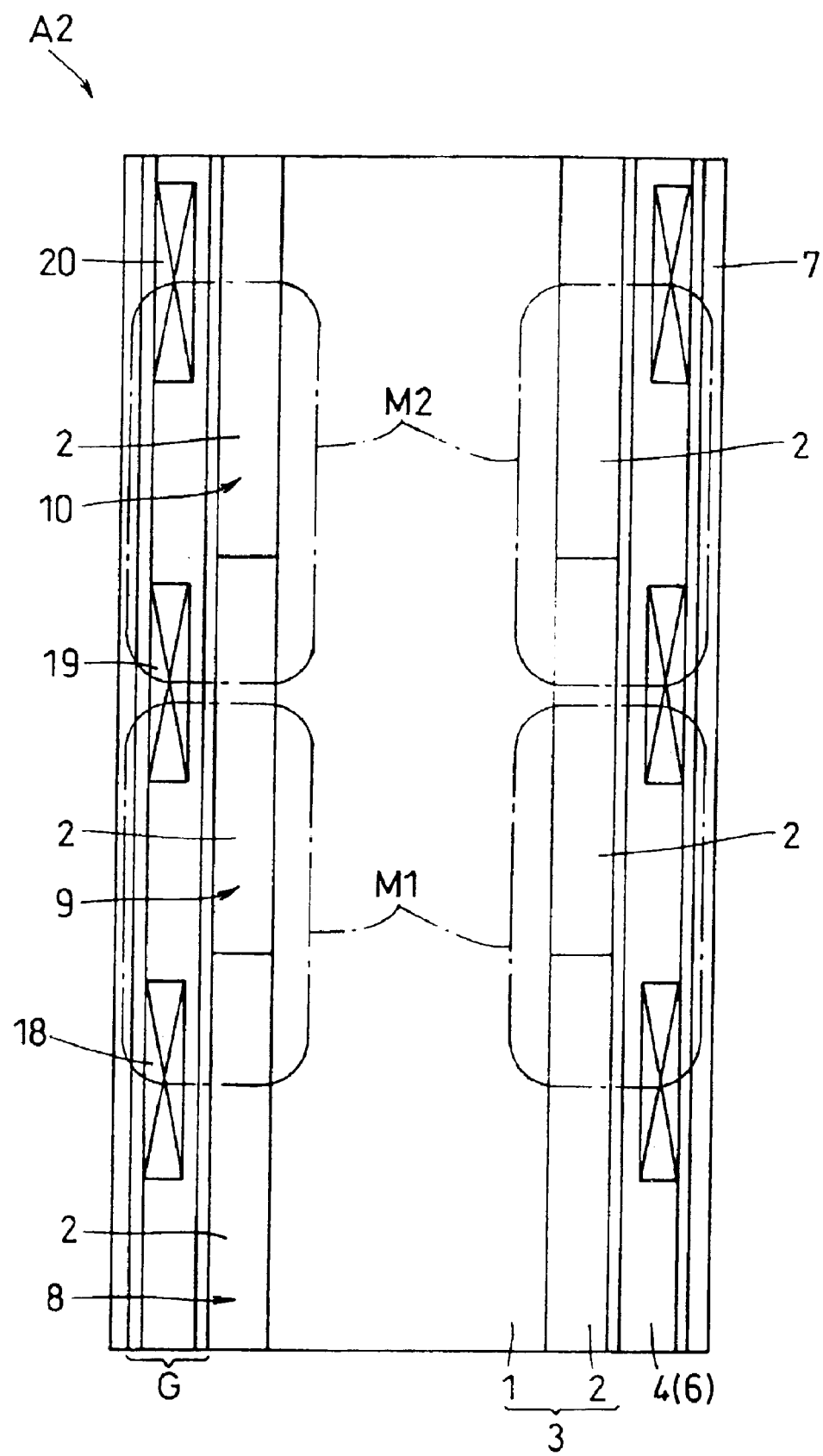
FIG. 12 is a vertical-sectional diagram illustrating the voice coil linear actuator according to the second embodiment of the present invention.
Figure 13:
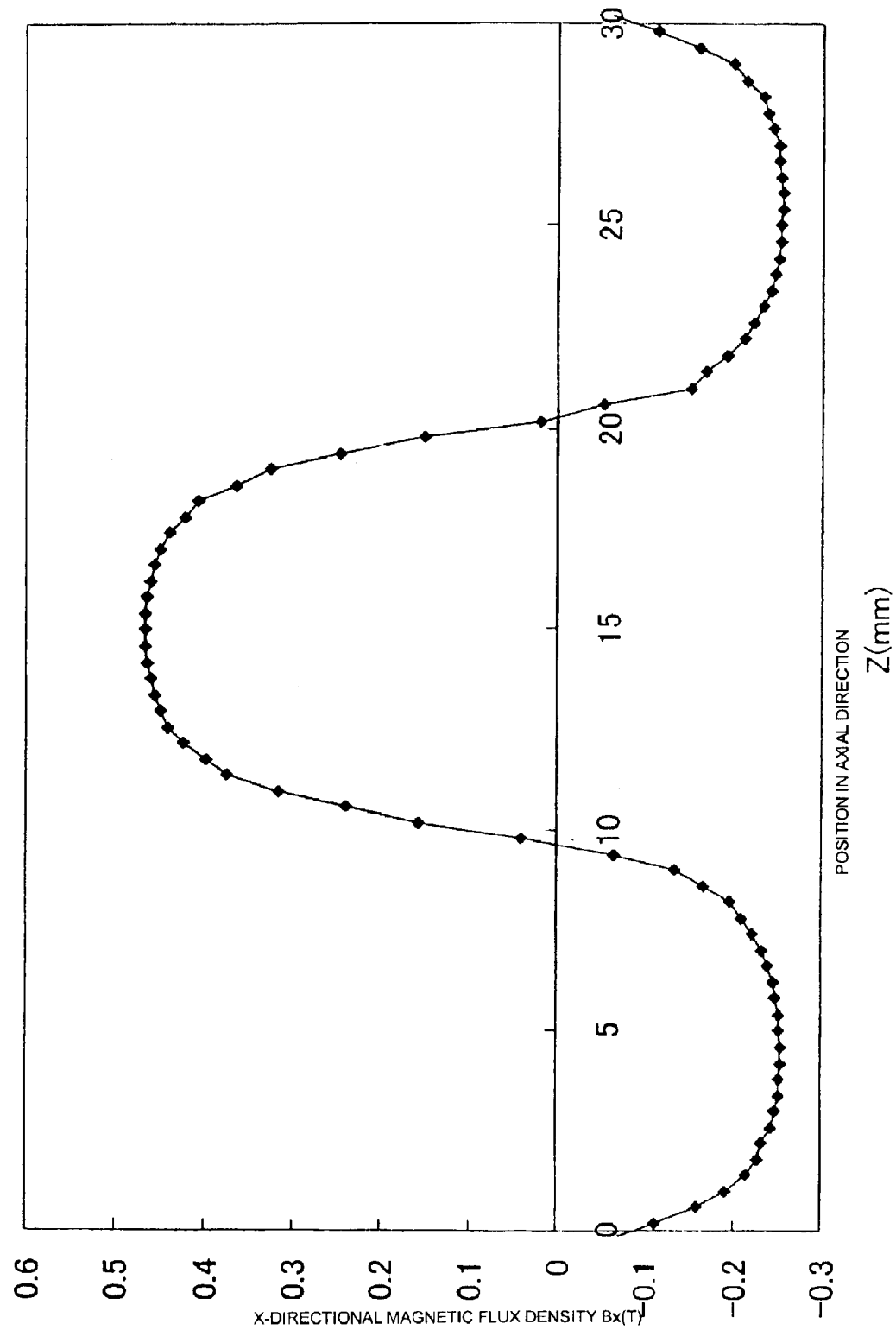
FIG. 13 is a graph illustrating the relation between the axial position on the voice coil linear actuator shown in FIG. 12 and the magnetic flux density.

Next, a second embodiment of the voice coil linear actuator according to the present invention will be described with reference to FIGS. 11 through 13 and others. The structures which are the same as those in the above-described first embodiment will be denoted with the same reference numerals, and illustrations in the drawings which are in common between the first and second embodiments will be described with reference to the drawings referred to with the first embodiment. Now, FIG. 11 is a schematic vertical-sectional diagram of the voice coil linear actuator indicating the dimensions of the components. FIG. 12 is a vertical-sectional diagram illustrating the voice coil linear actuator, and FIG. 13 is a graph illustrating the relation between the axial position on the voice coil linear actuator and the magnetic flux density.

With reference to FIG. 12, the voice coil linear actuator A2 comprises a center stator 3, an armature coil 6, and an outer yoke 7.

In detail, the armature coil 6 comprising a bobbin 4 formed of an aluminum alloy and a coil wire 5 wound thereupon is fitted around the center stator 3 so as to surround it. Further, an outer yoke 7 formed of a ferromagnetic material such as iron or iron-cobalt alloy or the like is fitted around the armature coil 6.

The center stator 3 has a center yoke 1 with a cylindrical shape (axial shape) 7 mm in diameter, formed of a ferromagnetic material such as iron or iron-cobalt alloy or the like. Multiple permanent magnets 2 are bonded and fixed to the outer perimeter of the center yoke 1 at predetermined positions. Each of the permanent magnets 2 is formed of a rare-earth metal magnet with a thickness of 1.5 mm in the radial direction, and is shaped as an arc-like plate for covering ⅛ of a circle in the circumferential direction, as described later. A total of eight of the permanent magnets 2 are arranged in a ring-shaped manner on the perimeter of the center yoke 1, and there are three sets thereof, positioned at three positions in the axial direction for a total of 24 permanent magnets 2. There are no gaps between adjacent permanent magnets 2, neither circumferencially nor axially, with all being in contact one with another.

The armature coil 6 is movable in the axial direction within the gap G which is a gap between the center stator 3 and the outer yoke 7.

The center stator 3 is configured such that opposite magnetic poles are alternately manifested in the axial direction by the ring-shaped permanent magnets arrayed in the axial direction. Each of the permanent magnets 2 forming the first magnetic pole 8 have an arc-like shape of a cylinder being split into eighths. Each of the permanent magnets 2 of the first magnetic pole 8 has been subjected to one-dimensional magnetization such that a magnetic field is generated in an arc-like shape from the outer circumference side toward the inner circumference side. Bonding eight of such permanent magnets 2 on the outer perimeter of the center yoke 1 so as to form a ring creates a magnetic pole wherein the outer surface face magnetized in the general radial direction becomes the S pole. The width of the magnetic pole in the axial direction of this first magnetic pole 8 is set so as to be 10 mm, as shown in FIG. 11.

The second magnetic pole 9 is also formed of eight permanent magnets 2 bonded in a ring shape, adjacent to the first magnetic pole 8. The direction of magnetization thereof is opposite to that of the first magnetic pole 8, so a magnetic pole wherein the outer surface side is the N pole is formed. The width of the magnetic pole in the axial direction of this second magnetic pole 9 is also set so as to be 10 mm.

A third magnetic pole 10 is also formed of eight permanent magnets 2 bonded in a ring shape, adjacent to the second magnetic pole 9. The direction of magnetization thereof is the same as that of the first magnetic pole 8, so a magnetic pole wherein the outer surface side is the S pole is formed. The width of the magnetic pole in the axial direction of this third magnetic pole 10 is also set so as to be 10 mm.

The armature coil 6 is formed as shown in FIG. 5, as with the above-described first embodiment. The bobbin 4 making up the armature coil 6 is shown in FIG. 6. The bobbin 4, formed of aluminum alloy in the general shape of a cylinder having a bottom, has three winding grooves 11, 12, and 13, each of a width of 5 mm and depth of 1 mm, at a pitch of 10 mm. The winding grooves 11, 12, and 13 correspond to the magnetic poles 8, 9, and 10 of the center stator 3. A coil wire 5 is wound onto the winding grooves 11, 12, and 13. The adjacent winding grooves 11, 12, and 13 are mutually connected by communicating grooves 14 and 15 which are each 1 mm in width and 1 mm in depth. The communicating grooves 14 and 15 allow one coil wire 5 to be continuously wound on the winding grooves 11, 12, and 13 of the bobbin 4. Accordingly, winding the coil wire 5 on the winding grooves 11, 12, and 13 respectively forms a first armature coil unit 18, second armature coil unit 19, and third armature coil unit 20. Also, communicating grooves 16 and 17 which are each 1 mm in width and 1 mm in depth are provided between the first winding groove 11 and the bottom of bobbin, and the third winding groove 13 and the top of the bobbin. The communicating grooves 16 and 17 allow the coil wire 5 to be externally extended without interfering with the outer yoke 7.

The direction of winding the coil wire of the second armature coil unit 19 is opposite to that for the first and third armature coil units 18 and 20. Accordingly, the direction of force generated when applying electric current to each is aligned. That is to say, the armature coil units 18, 19, and 20, and the magnetic poles of the magnets which they face, are aligned in a constant direction with regard to the relation of generating force.

With the second embodiment as well, for example, the voice coil linear actuator maybe used as an actuator for performing the vertical (Z-axial) moving operations of the parts mounting heads H1 and H2 in the parts assembly apparatus shown in FIGS. 32 and 33, as with the first embodiment. In this case, the outer yoke 7 and center stator 3 of the voice coil linear actuator A2 are fixed to the supporting plate 25, and as shown in FIG. 10, the vertical movement of the armature coil 6 is extracted by the linking member 24, and transmitted to the action linking mechanism 26.

Next, the advantages of the embodiments of the present invention will be described in comparison with conventional arrangements, based on the results of simulations performed by the present inventor.

The simulation of the voice coil linear actuator A2 according to the second embodiment of the present invention, i.e., a voice coil linear actuator A2 wherein three layers of magnets 2 are provided in the axial direction and wherein no base yoke 21 (see FIG. 1) is provided, was carried out with the dimensional settings and component arrangements shown in FIG. 11. In this case, the form of the outer yoke 7 is a cylindrical model, due to the two-dimensional axis-symmetrical analysis, which is different from the above-described embodiment which has a polygonal pillar-shaped outer form, but it is thought that there are no major differences in the tendencies thereof.

According to the simulation, the distribution in the axial direction of the radial-direction component of the magnetic flux density at the center of the gap G is as shown in FIG. 13. The X direction shown in FIG. 13 is the radial direction. Note that in the other graphs illustrating the relation between the axial position on the voice coil linear actuator and the magnetic flux density regarding the embodiments of the present invention and comparative examples as described later, the X direction means the radial direction, as with FIG. 13. The positions for measuring the magnetic flux density here are on a straight line following the axial direction which passes through the center of the radial-direction width of the armature coil units 18, 19, and 20 (equivalent to the straight line L indicated by the two-dot broken line in FIG. 1).

Figure 14:
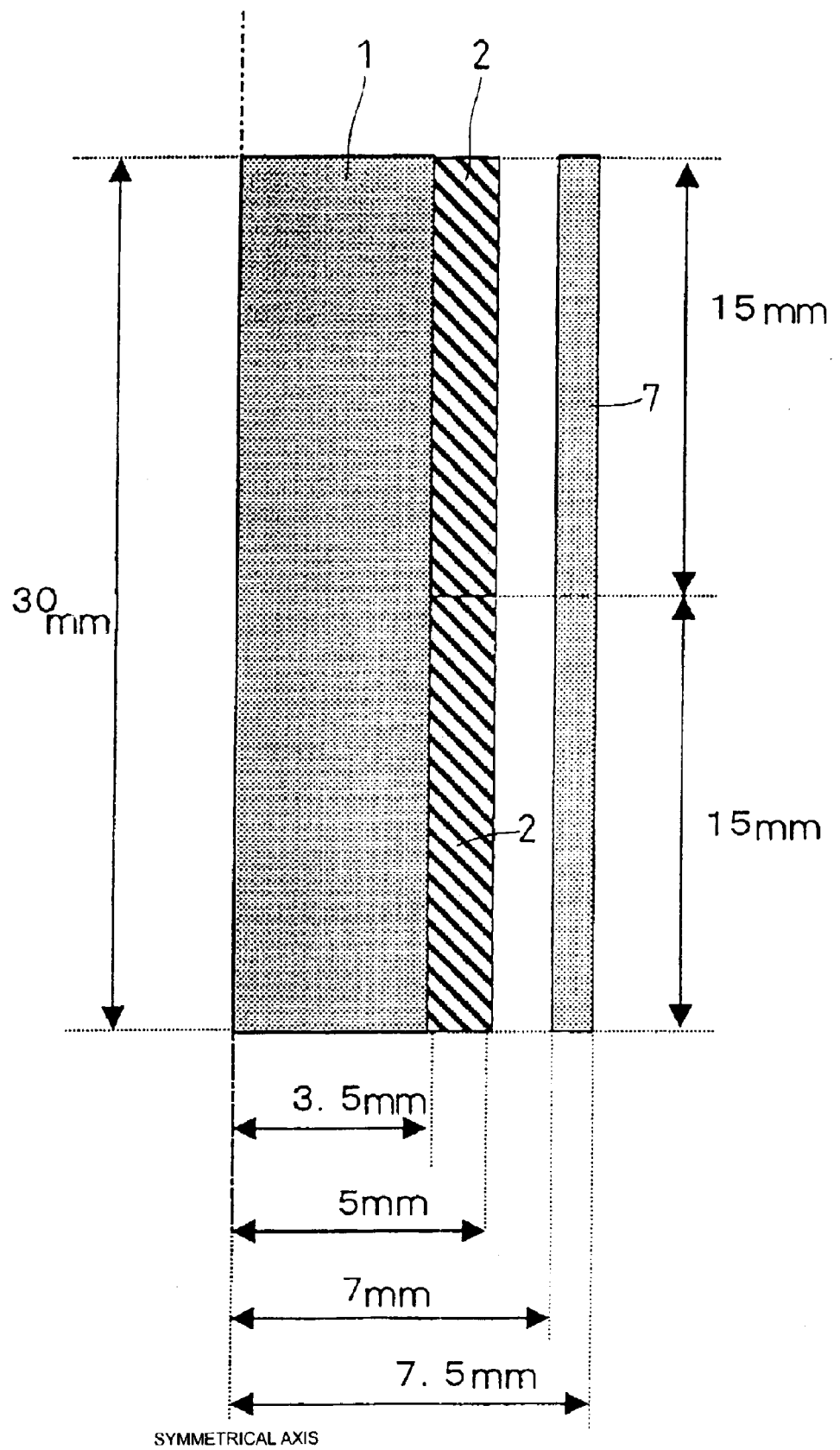
FIG. 14 is a schematic vertical-sectional diagram illustrating one half of a conventional voice coil linear actuator with two layers of magnets disposed in the axial direction as a comparative example, and the dimensions thereof.
Figure 15:
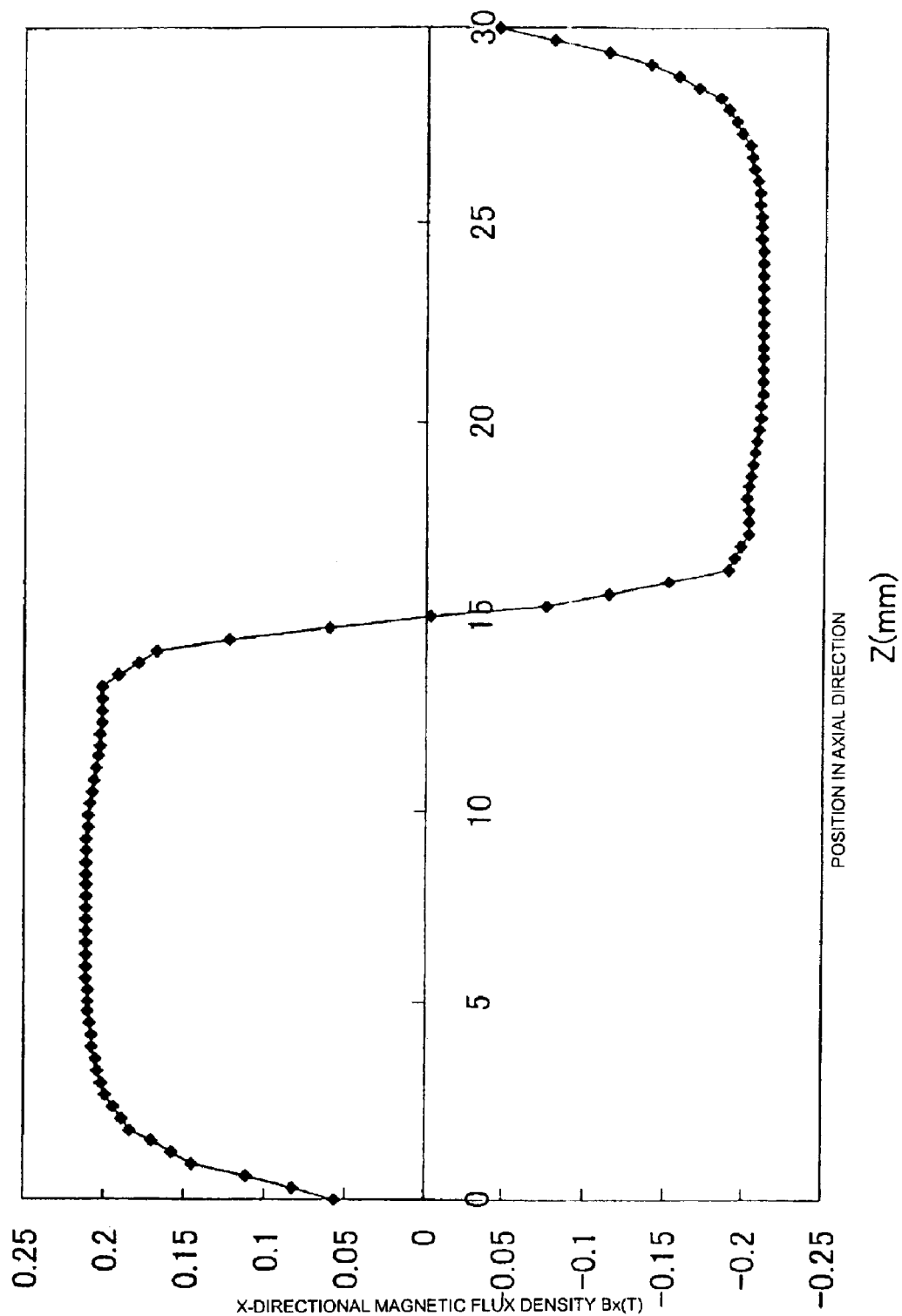
FIG. 15 is a graph illustrating the relation between the axial position on the voice coil linear actuator shown in FIG. 14 and the magnetic flux density.

Conversely, FIG. 14 illustrates a simulation with an arrangement wherein the magnet 2 is configured in two layers in the axial direction, as a conventional example. In this case, the magnet 2, gap distance, outer yoke dimensions, and center yoke dimensions are the same, the width of the magnet 2 is extended to 15 mm, and the magnet 2 is configured in two layers in the axial direction, wherein the axial-direction distribution of the radial direction component of the magnetic flux density is as shown in FIG. 15.

Comparing the simulation results with the present invention, it is clear that the radial direction component of the magnetic flux density with a conventional configuration (FIG. 15) is small over the entire axial direction. In contrast, the magnetic flux density with the invention (FIG. 13) is much higher, at least near the middle of the armature coil. Accordingly, even taking into consideration the advantage that the coil length can be made longer, it can be understood that the configuration according to the present invention is more advantageous regarding generation of thrust at the armature coil.

Figure 16:
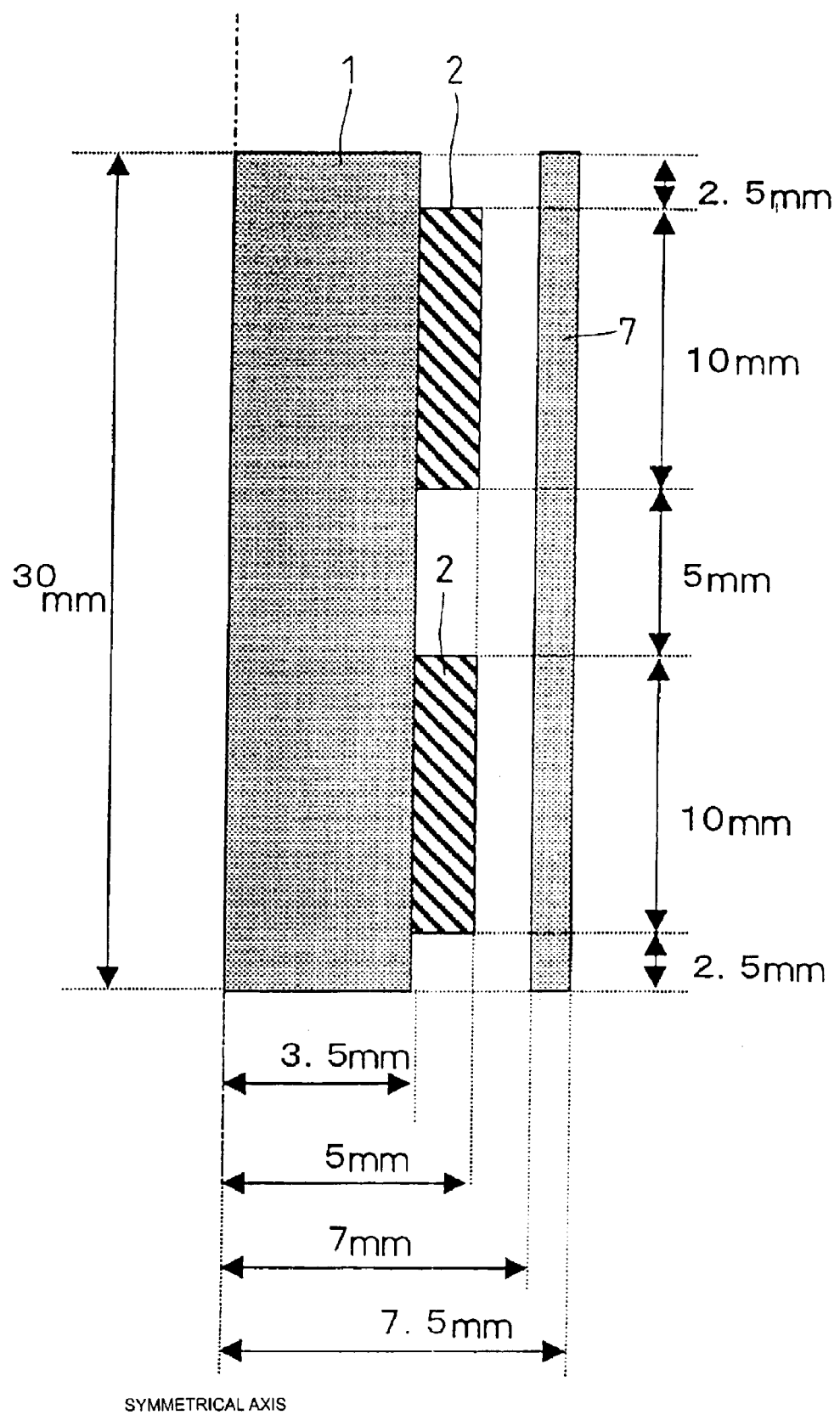
FIG. 16 is a schematic vertical-sectional diagram illustrating one half of a conventional voice coil linear actuator with two layers of magnets disposed in the axial direction as another comparative example, and the dimensions thereof.
Figure 17:
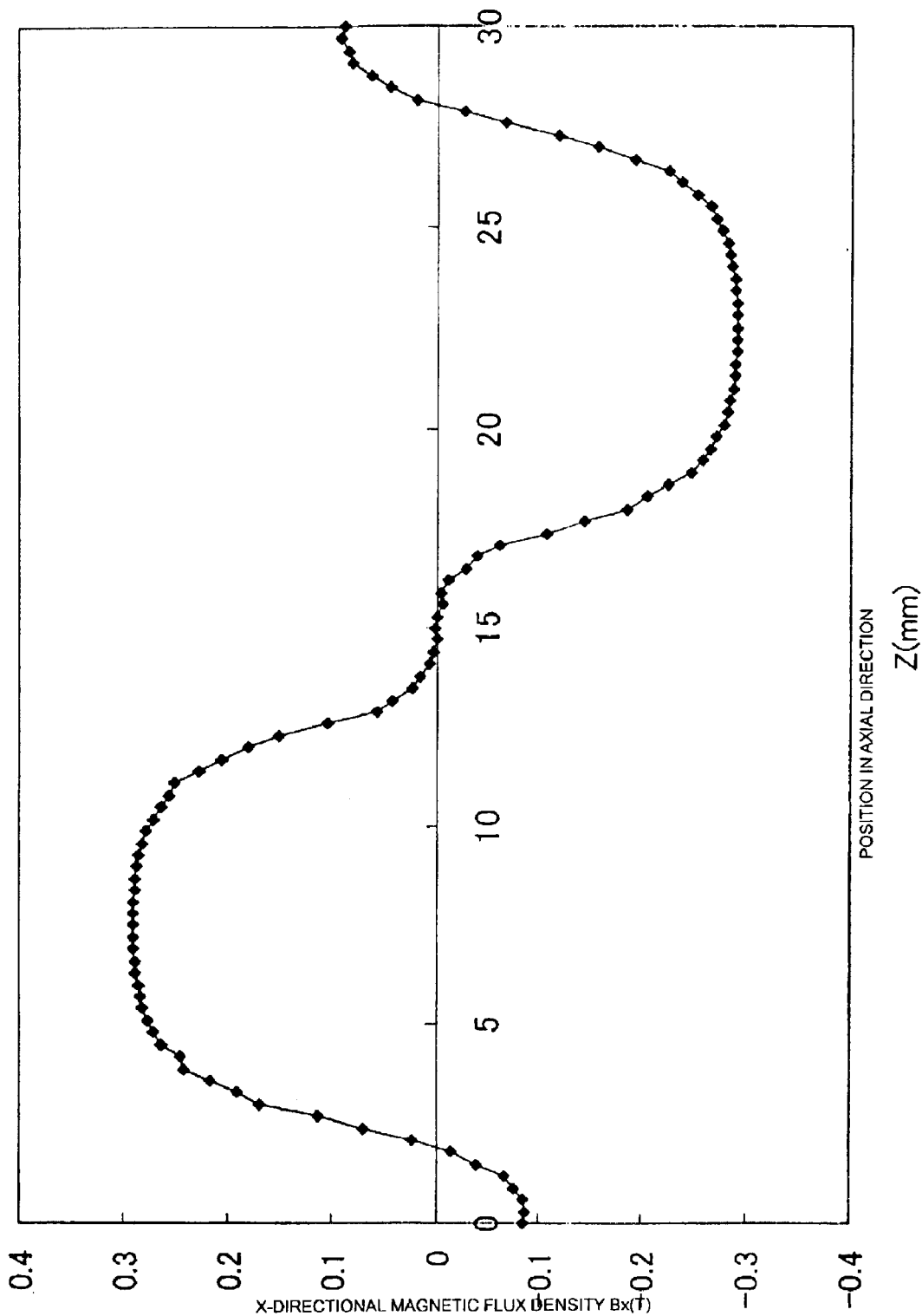
FIG. 17 is a graph illustrating the relation between the axial position on the voice coil linear actuator shown in FIG. 16 and the magnetic flux density.

Also, as disclosed in FIG. 5 of Japanese Unexamined Patent Application Publication No. 11-69755, a case wherein there are gaps between magnets was simulated with the width of the magnets being 10 mm, the gap between the two magnets 2 being 5 mm, and the distance from the yoke end portion to the magnet 2 being 2.5 mm (see FIG. 16). The axial-direction distribution of the radial direction component of the magnetic flux density at the gap G was as shown in FIG. 17. The magnetic flux density at the portion facing the magnet was higher than that shown in FIG. 15, but was considerably lower than that shown in FIG. 13, and also, it can be understood that magnetic flux density in the opposite direction is generated at the outer portions of both ends of the magnets 2, acting as a brake.

With the example disclosed in FIG. 5 of Japanese Unexamined Patent Application Publication No. 11-69755, a base yoke 21 is added, to be accurate. The simulation thereof was performed with the arrangement shown in FIG. 18. The axial-direction distribution of the radial direction component of the magnetic flux density at the center of the gap G was as shown in FIG. 19. In this case, while there is some improvement, the present invention wherein three layers of the magnets 2 are provided in the axial direction is more advantageous.

Figure 21:
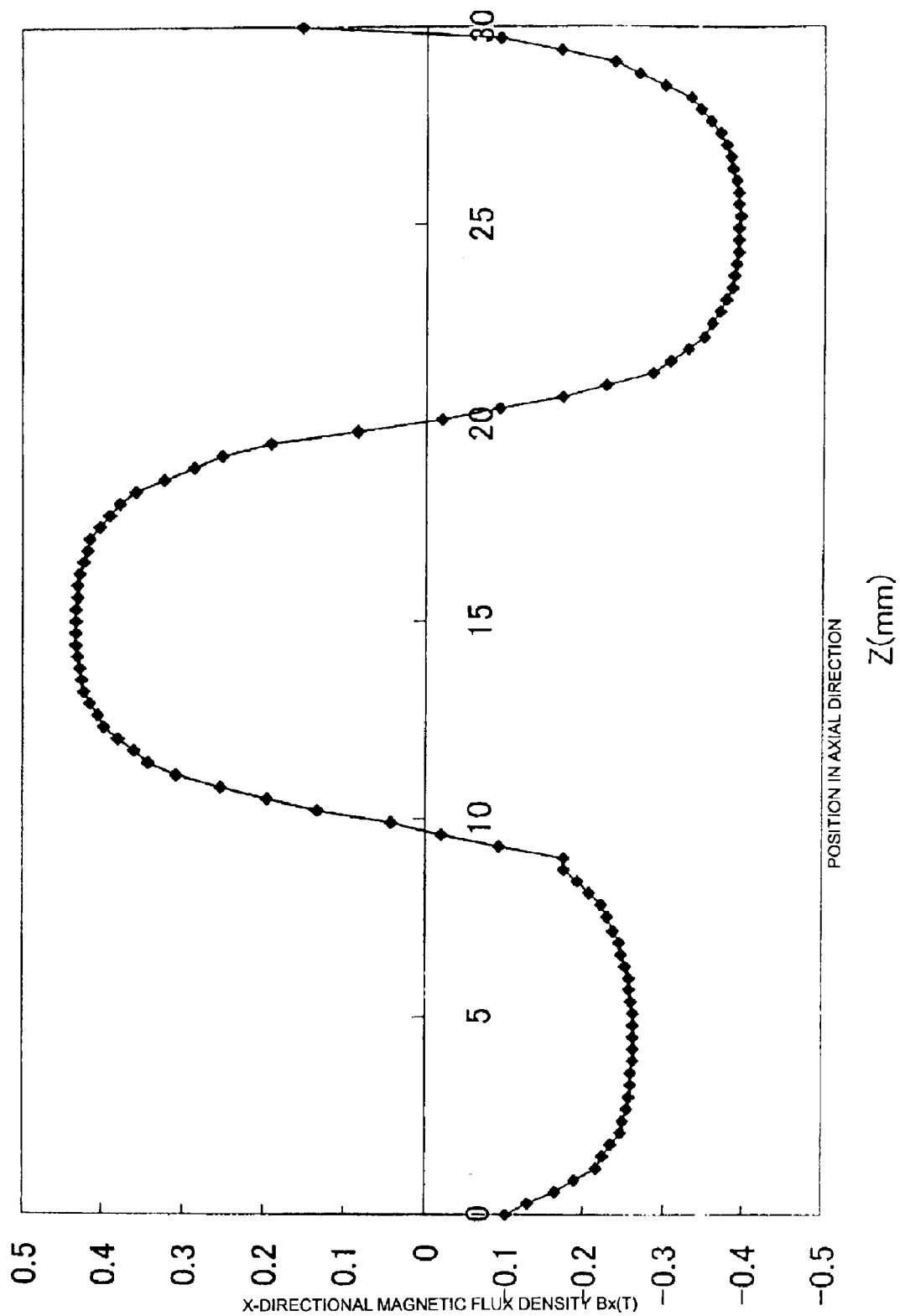
FIG. 21 is a graph illustrating the relation between the axial position on the voice coil linear actuator shown in FIG. 20 and the magnetic flux density.

Improvement due to addition of the base yoke 21 was also obtained in the arrangement with three layers of magnets. The simulation for this was performed with the arrangement shown in FIG. 20. The voice coil linear actuator A1 shown in FIG. 20 is a specific example of the first embodiment. The axial-direction distribution of the radial direction component of the magnetic flux density at the center of the gap G in this simulation was as shown in FIG. 21. Accordingly, the present invention wherein three layers of the magnets 2 are provided in the axial direction is more advantageous, with or without the base yoke 21.

This advantage will now be described in detail. The thrust F of the voice coil linear actuator can be represented by F=BIL, wherein B represents the average value of the effective component of the magnetic flux density (the radial-direction component with the present invention), I represents the current flowing through the coil, and L represents the coil length. On the other hand, W=RI² holds wherein W represents the amount of heat generated by the voice coil linear actuator, and R represents the resistance value of the coil wire.

Accordingly, the relation between the amount of heat W generated by the voice coil linear actuator and the thrust F is as follows:

Expression 1

$$F = \frac{BL}{\sqrt{R}} W^{\frac{1}{2}} \qquad (1)$$

The design target of the voice coil linear actuator is to suppress generation of heat and to increase thrust, and according is to maximize the following:

Expression 2

$$\frac{BL}{\sqrt{R}} \qquad (2)$$

In the event of using coil wires with the same diameter, R and L are in a proportional relation, so maximizing the following is sufficient:

Expression 3

$$B\sqrt{L} \qquad (3)$$

The coil in the voice coil linear actuator A according to the present invention in the above-described simulation has three armature coil units with winding widths for each armature coil unit of 5 mm, so a total winding with of 15 mm can be obtained. On the other hand, in the event of forming the magnet 2 of two layers in the axial direction, the winding width of each armature coil unit is 10 mm for a total of 20 mm of winding width for the two armature coil units. That is to say, in the event of configuring the magnet 2 with two layers in the axial direction, the coil length is ⅔ that of the present invention.

Looking at the above Expression 3, it can be said that the arrangement with two layers of the magnets 2 in the axial direction is more advantageous with the L of ⅔ times, as long as B exceeds 0.866 times. However, as shown in FIGS. 15, 17, and 19, actual simulation shows that the radial direction component of the magnetic flux density is far smaller than with the arrangement according to the present invention wherein three layers of the magnets 2 are provided in the axial direction. It is also clear that the average value thereof falls below 0.87 times.

Actually calculating the average value of the effective component of the magnetic flux density yields the following for the arrangement shown in FIG. 11 wherein three layers of the magnets 2 are provided in the axial direction:

Expression 4

$$\tilde{B}_x = \frac{1}{30}\left(-\int_0^{10} B_x dx + \int_{10}^{20} B_x dx - \int_{20}^{30} B_x dx\right) = 0.266T$$

On the other hand, with the arrangement shown in FIG. 14 wherein two layers of the magnets 2 are provided in the axial direction, Expression 5

$$\tilde{B}_x = \frac{1}{30}\left(\int_0^{15} B_x dx - \int_{15}^{30} B_x dx\right) = 0.188T$$

and with the arrangement shown in FIG. 16,

Expression 6

$$\tilde{B}_x = \frac{1}{30}\left(\int_0^{15} B_x dx - \int_{15}^{30} B_x dx\right) = 0.164T$$

are obtained.

Figure 18:
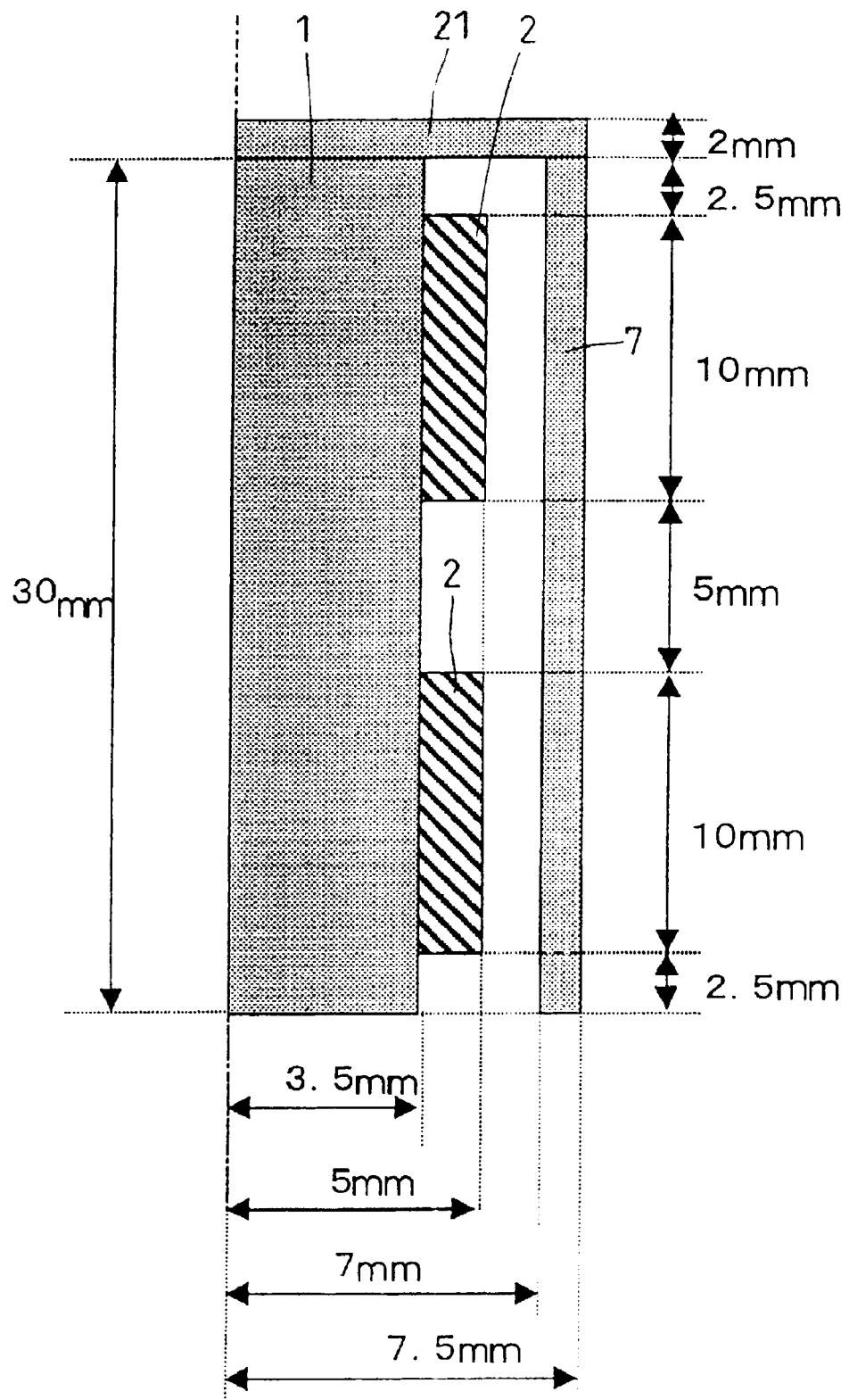
FIG. 18 is a schematic vertical-sectional diagram illustrating one half of a conventional voice coil linear actuator with two layers of magnets disposed in the axial direction as yet another comparative example, and the dimensions thereof.
Figure 19:
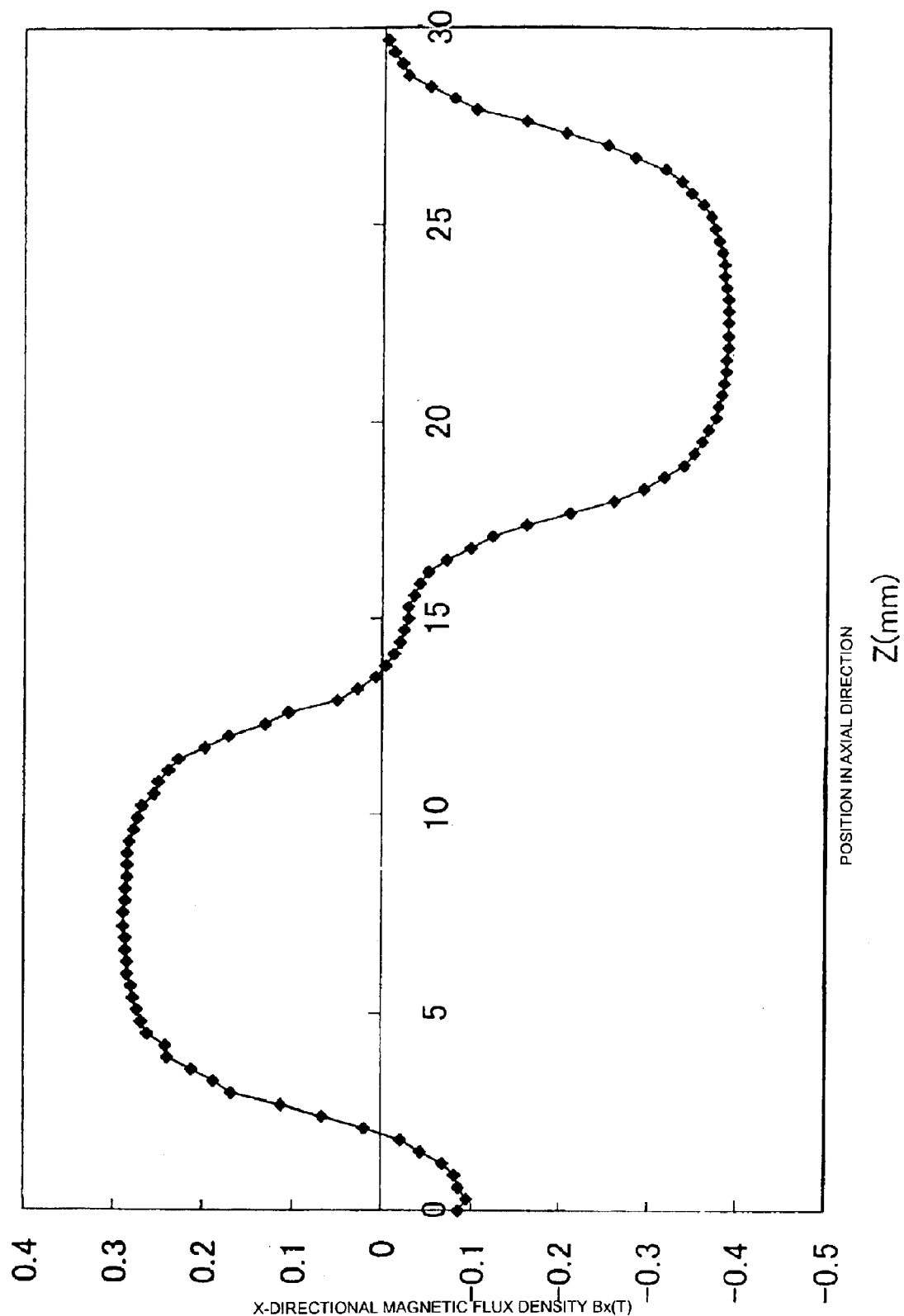
FIG. 19 is a graph illustrating the relation between the axial position on the voice coil linear actuator shown in FIG. 18 and the magnetic flux density.

With the arrangement shown in FIG. 18 wherein the base yoke is added to the arrangement in which two layers of the magnets 2 are provided in the axial direction, Expression 7

$$\tilde{B}_x = \frac{1}{30}\left(\int_0^{15} B_x dx - \int_{15}^{30} B_x dx\right) = 0.193T$$

and with the arrangement shown in FIG. 20 wherein the base yoke is added to the arrangement in which three layers of the magnets 2 are provided in the axial direction, Expression 8

$$\tilde{B}_x = \frac{1}{30}\left(-\int_0^{10} B_x dx + \int_{10}^{20} B_x dx - \int_{20}^{30} B_x dx\right) = 0.290T$$

are obtained.

Accordingly, forming the magnet with three layers in the axial direction is more advantageous. Other advantages of forming the magnet with three layers in the axial direction include reduced coil length for each, so inductance is reduced, and the current rises faster.

Also, as shown in FIGS. 16 and 18, in the event of providing gaps between the magnets, increased irregularities in the thrust over the length of the stroke can be readily expected from the shape of the magnetic flux density shown in FIGS. 17 and 19. Accordingly, the arrangement shown in FIG. 11 or FIG. 20 wherein three layers are provided with no gaps between is superb from the perspective of avoiding irregularities in thrust, as well.

Figure 22:
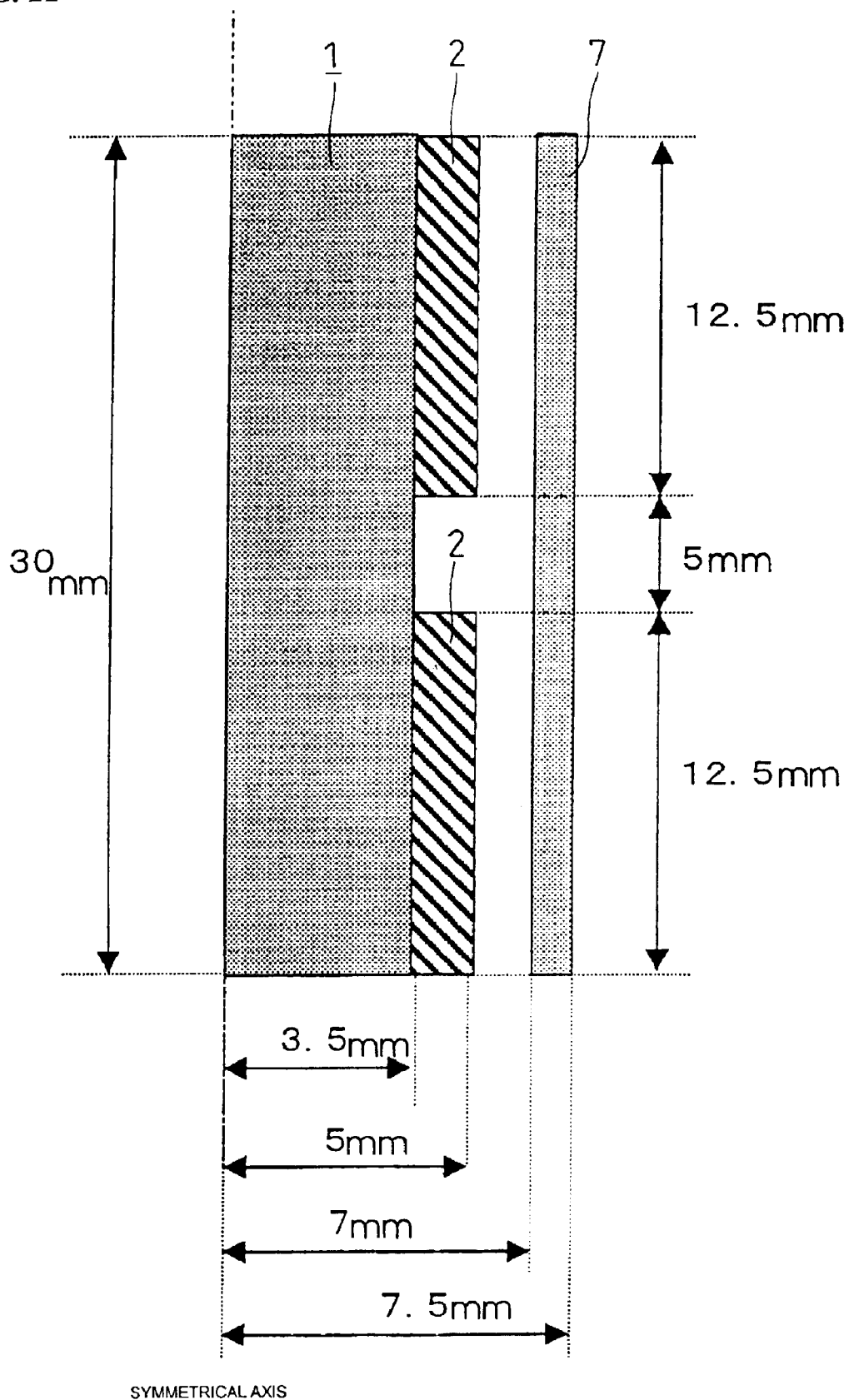
FIG. 22 is a schematic vertical-sectional diagram illustrating one half of a conventional voice coil linear actuator with two layers of magnets disposed in the axial direction as yet another comparative example, and the dimensions thereof.

Now, an arrangement may be conceived for the configuration with two layers of magnets in the axial direction, wherein the magnets are placed as shown in FIG. 22, the winding width of the respective armature coil units is 12.5 mm, disposed so there is no gap between the two armature coil units, thereby securing an armature coil unit with a length of 25 mm. Because the armature coil unit doesn't directly face the magnet in the opposite direction even if there is no gap between the armature coil units, in an arrangement with a gap between the magnets.

Figure 23:
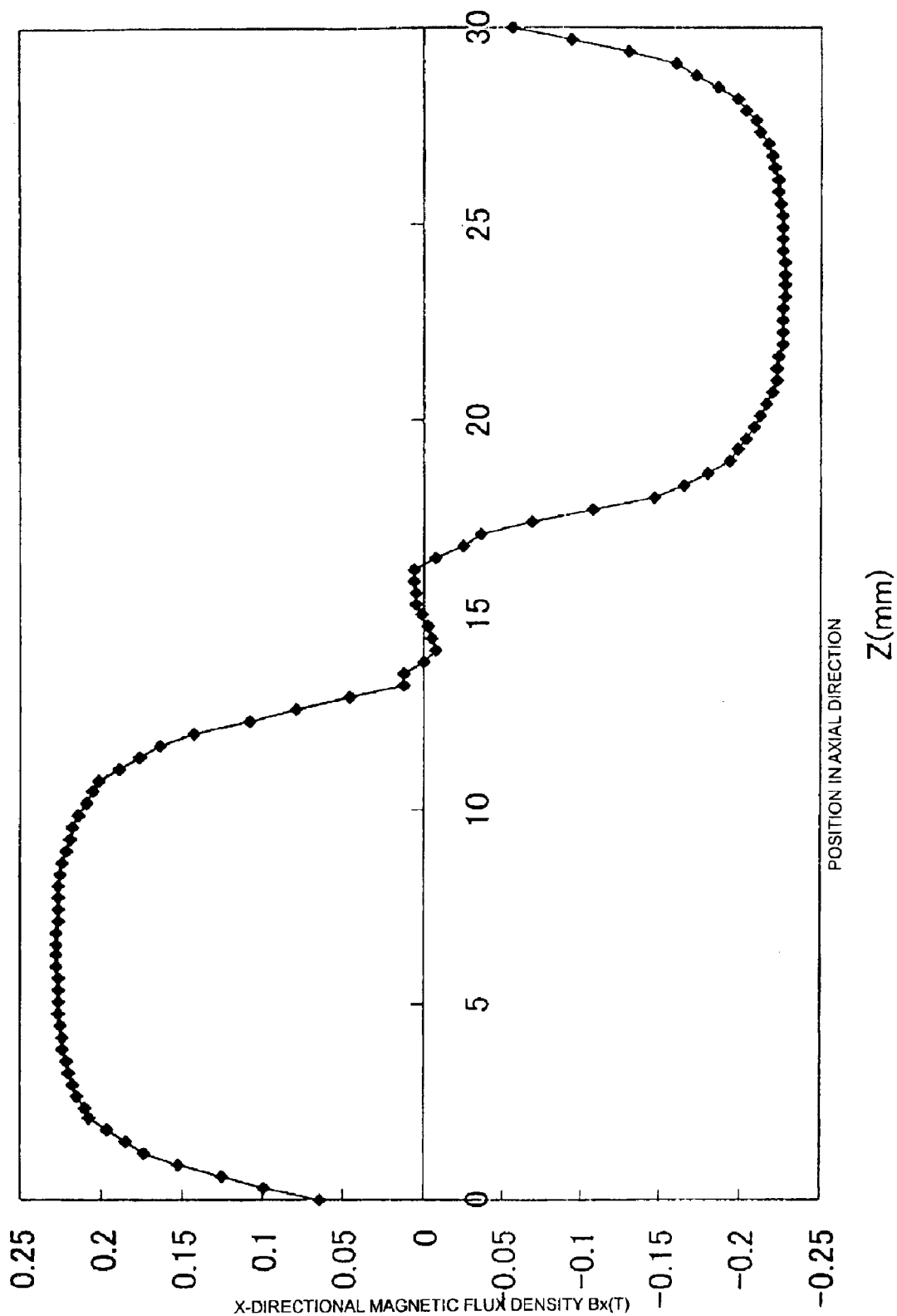
FIG. 23 is a graph illustrating the relation between the axial position on the voice coil linear actuator shown in FIG. 22 and the magnetic flux density.

In this case, the axial-direction distribution of the radial direction component of the magnetic flux density is as shown in FIG. 23.

Taking the displacement and movement of the armature coil unit into consideration, the average value of the effective component of the magnetic flux density should be calculated as follows:

Expression 9

$$\tilde{B}_x = \frac{1}{2}\left(\frac{1}{17.5}\int_0^{17.5} B_x dx - \frac{1}{17.5}\int_{12.5}^{30} B_x dx\right) = 0.143T$$

Figure 24:
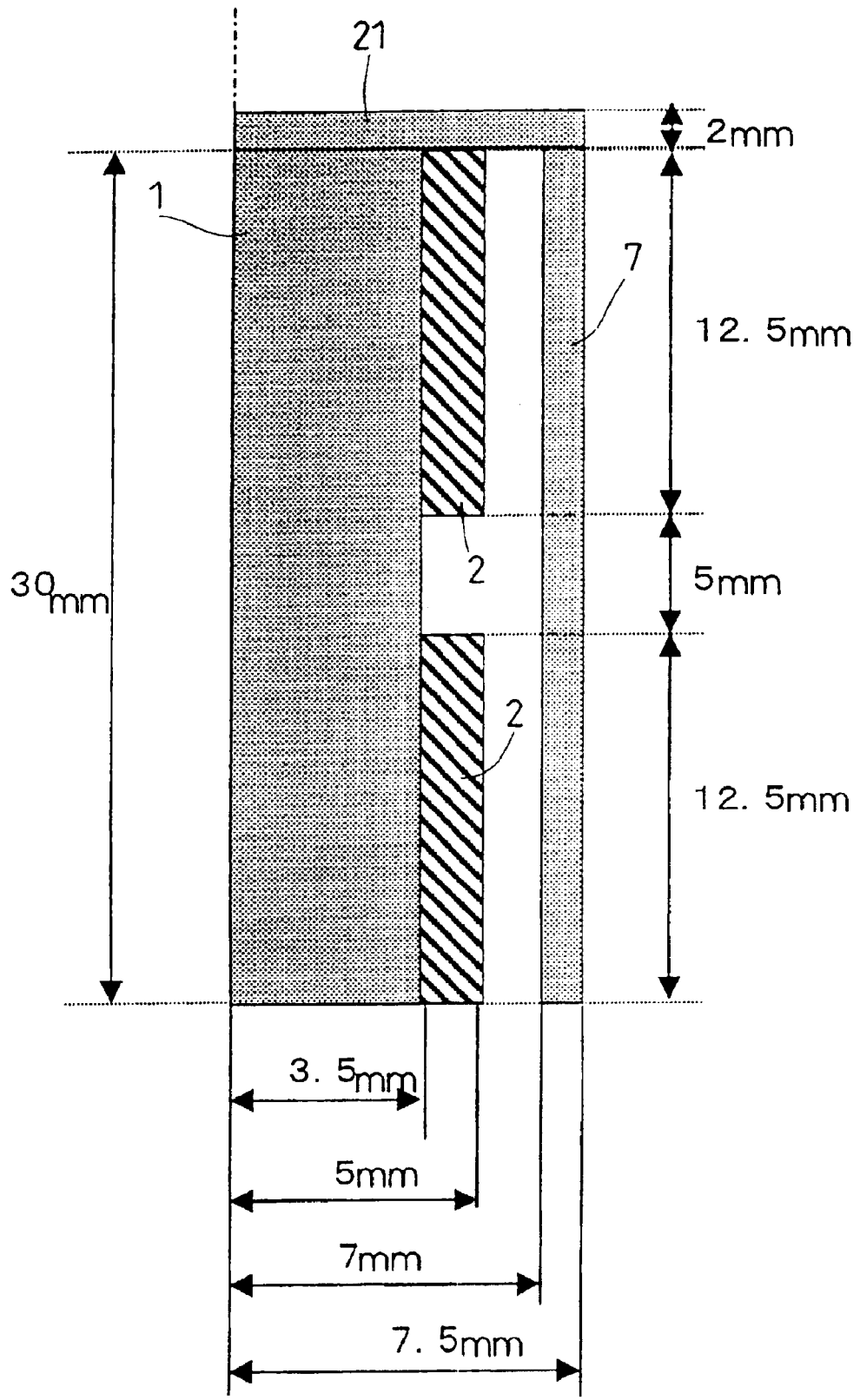
FIG. 24 is a schematic vertical-sectional diagram illustrating one half of a conventional voice coil linear actuator with two layers of magnets disposed in the axial direction as yet another comparative example, and the dimensions thereof.
Figure 25:
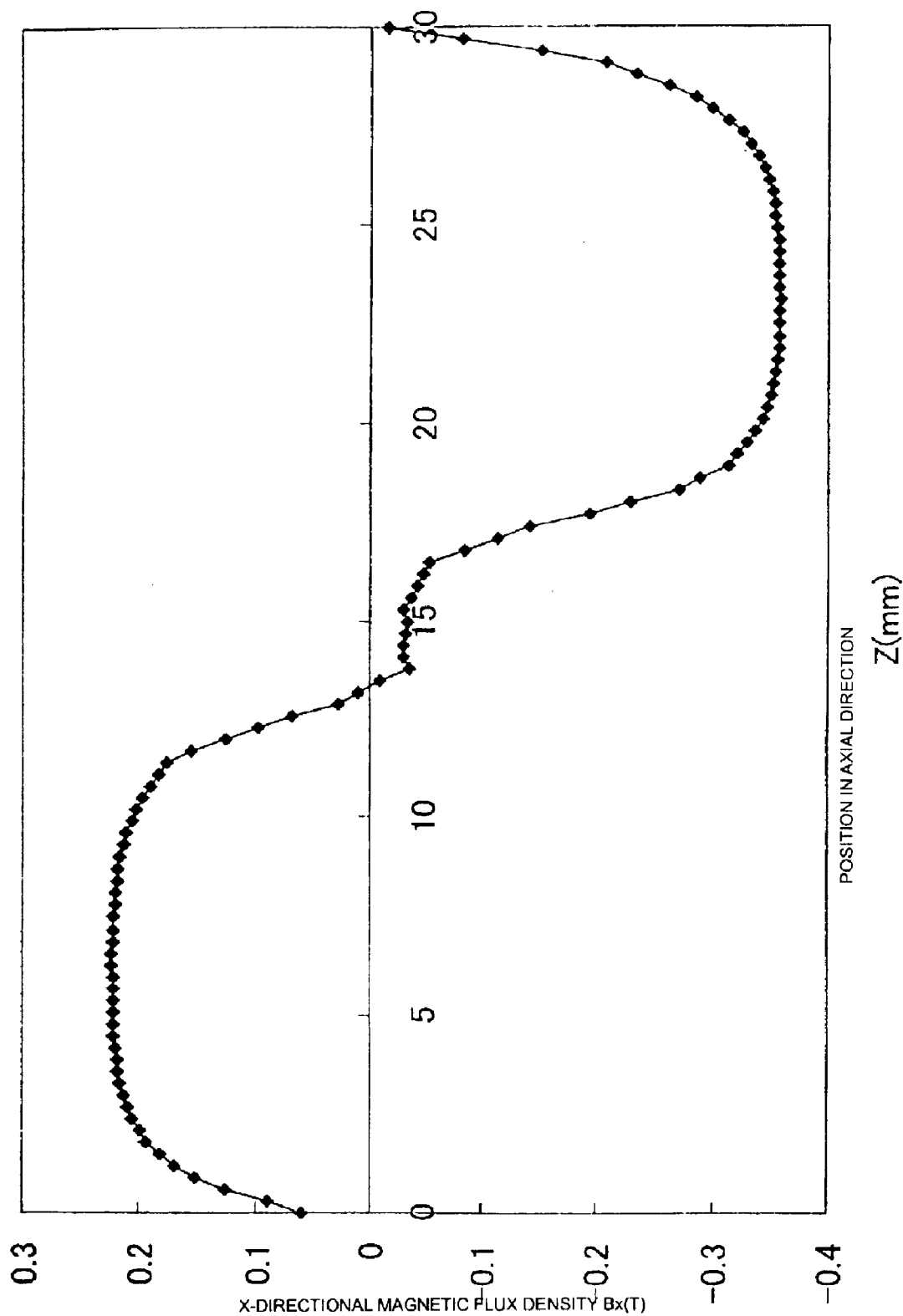
FIG. 25 is a graph illustrating the relation between the axial position on the voice coil linear actuator shown in FIG. 24 and the magnetic flux density.

Also, in the event of adding the base yoke 21 and performing simulation as shown in FIG. 24, the axial-direction distribution of the radial direction component of the magnetic flux density is as shown in FIG. 25, and the average value of the effective component of the magnetic flux density is as follows:

Expression 10

$$\tilde{B}_x = \frac{1}{2}\left(\frac{1}{17.5}\int_0^{17.5} B_x dx - \frac{1}{17.5}\int_{12.5}^{30} B_x dx\right) = 0.178T$$

In these cases, the coil length is 5/3 times that of the above-described embodiments of the present invention wherein the magnet is formed with three layers in the axial direction, so it can be said that the arrangement with two layers of the magnets 2 in the axial direction is more advantageous as long as B exceeds 0.775 times. However, the above calculations show that B falls below 0.775 times that obtained by the configuration wherein the magnet is formed with three layers, thus once again confirming the superiority of the voice coil linear actuator wherein three layers of the magnets are provided in the axial direction.

Figure 26:
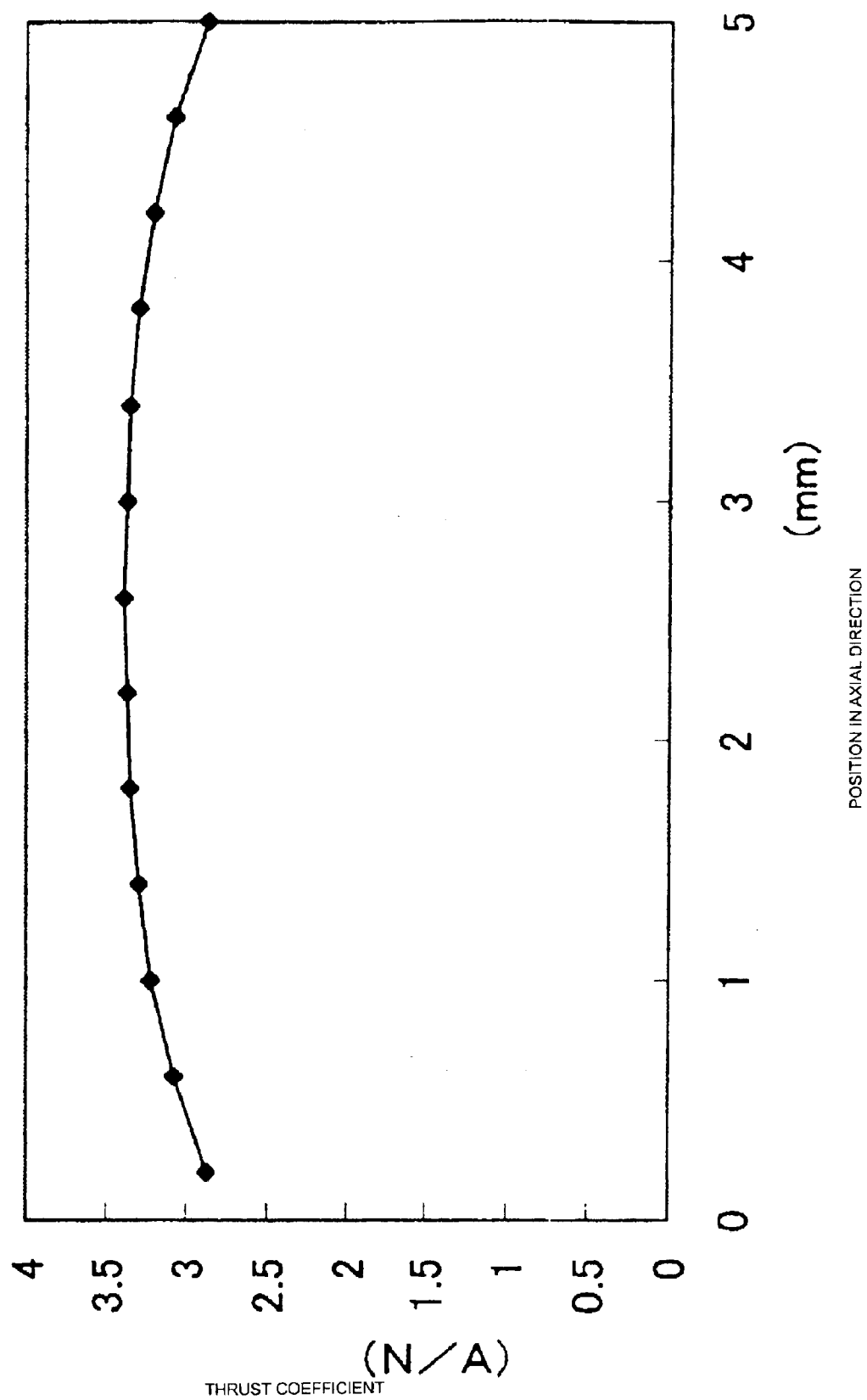
FIG. 26 is a graph illustrating the relation between the thrust and the axial position on a voice coil linear actuator according to an embodiment of the present invention, obtained by simulation.
Figure 27:
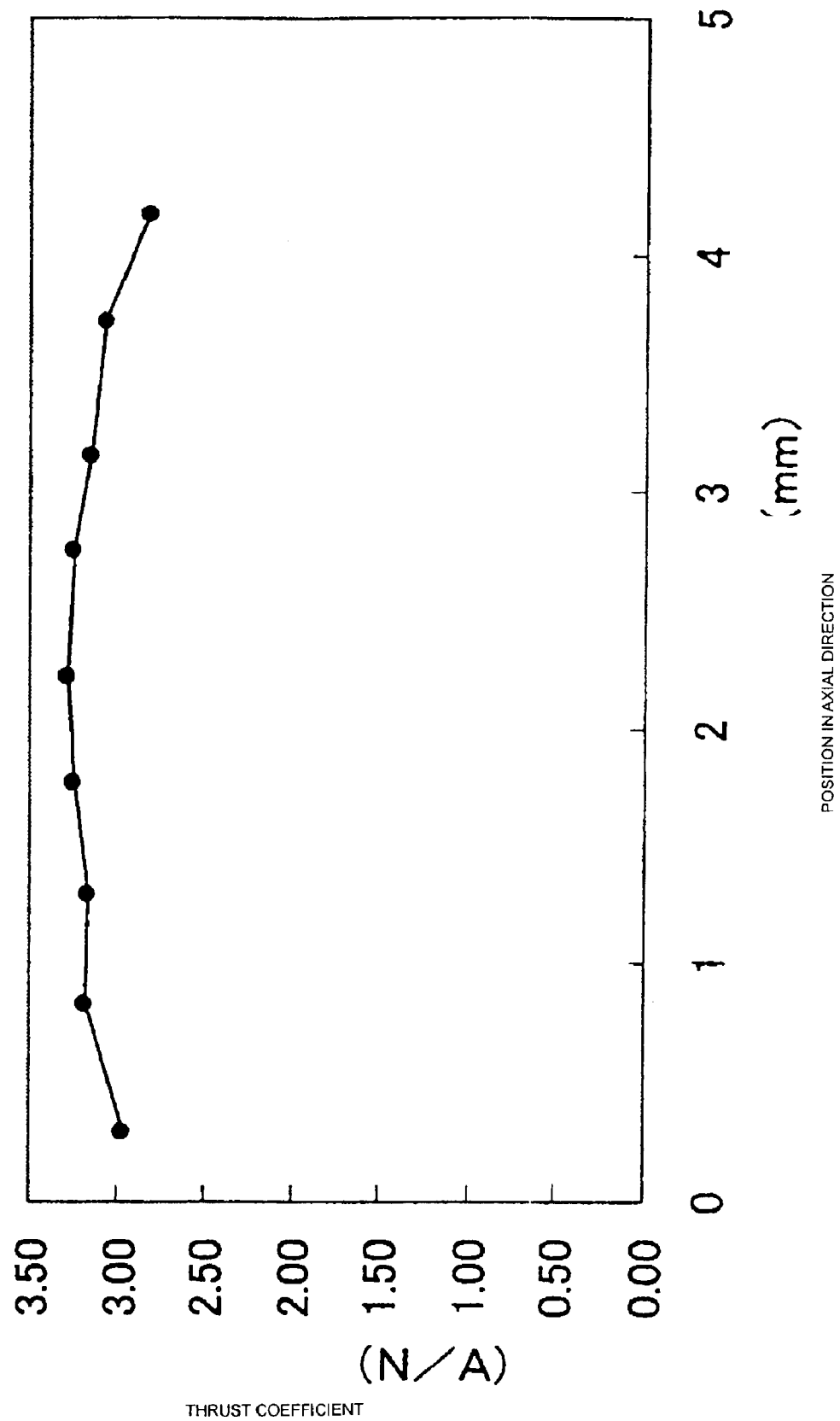
FIG. 27 is a graph illustrating the relation between the thrust and the axial position on a voice coil linear actuator according to an embodiment of the present invention, obtained by actual measurement.

As described above, with a conventional voice coil linear actuator wherein two layers of magnets are provided in the axial direction, a great magnetic flux density cannot be obtained with a small configuration. On the other hand, the axial-direction distribution of the radial direction component of the magnetic flux density shows a large value at the center of the magnetic gap with the present invention, as shown in FIG. 13 or FIG. 21. Thus, an arrangement wherein three layers of magnets are provided in the axial direction generates a particularly large magnetic flux density at the outside of the second layer of magnets. Even in the event that the voice coil linear actuator is reduced in size in the radial direction, the adjacent magnetic poles close the magnetic circuit, so high magnetic flux density can be obtained. With the present invention, the magnetic circuit is closed by adjacent magnets of at least three layers of magnets in the axial direction, so high magnetic flux density can be obtained even without the outer yoke. However, including the outer yoke further increases the magnetic flux density and is more effective, so a configuration using an outer yoke also serving as an outer cover for the actuator is advantageous. Looking at FIG. 13, it may seem at a glance that there are major irregularities in the thrust over the length of the stroke, but the width of the armature coil units of the armature coil is 5 mm, so calculating the thrust constant with the coil wire dimensions the same as in the first embodiment yields that shown in FIG. 26, showing that there are no great irregularities. FIG. 27 is a graph of actual measurement values with the above first embodiment. The actually-measured values also show that there are no great irregularities in the thrust.

Modified Embodiments

Figure 28:
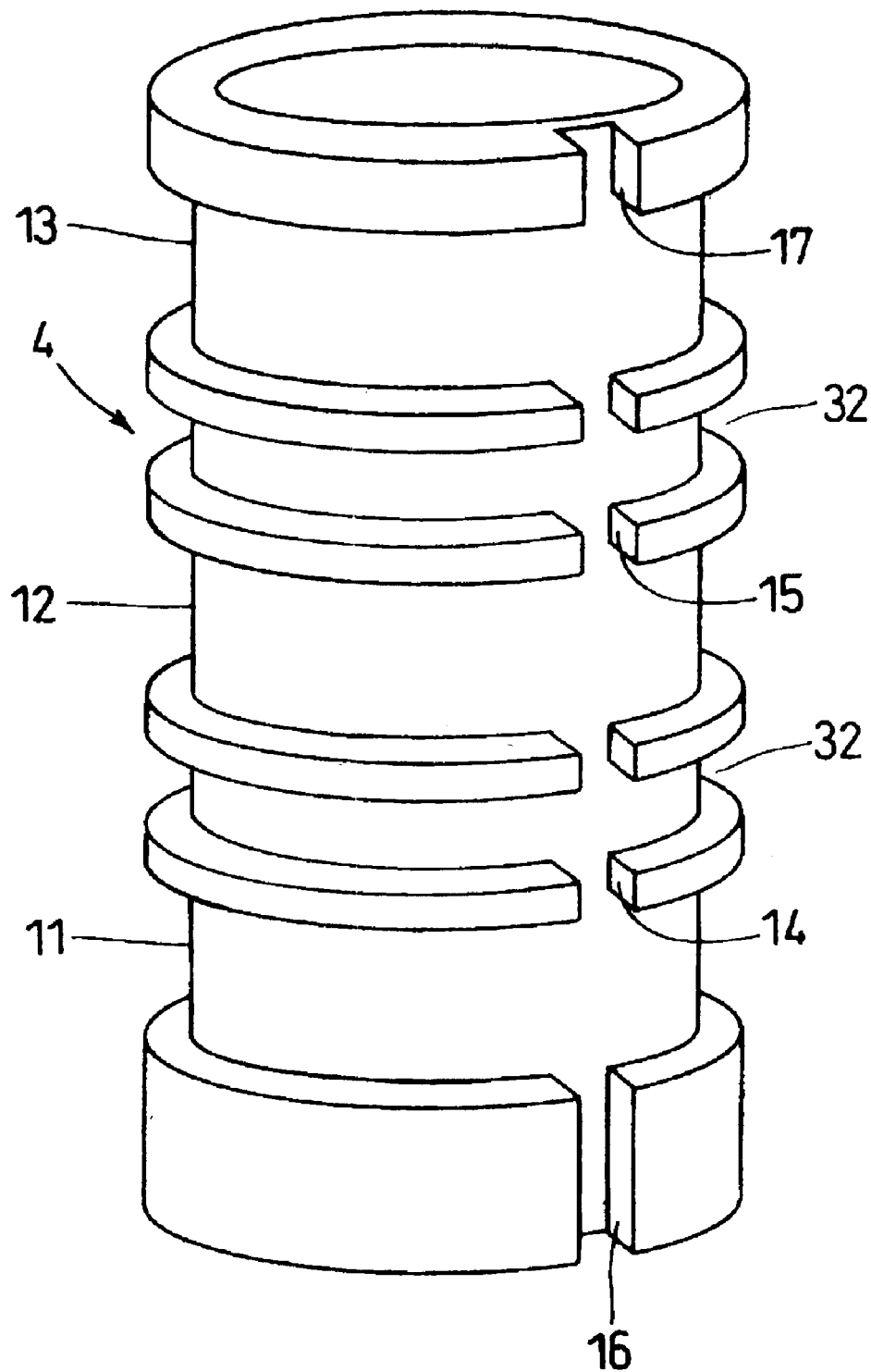
FIG. 28 is a perspective view of a modification of a bobbin.

While the above first and second embodiments have been described with the width of the armature coil units and the stroke of the actuator both being 5 mm, i.e., the same, and the magnet width being 10 mm, the width of the armature coil unit and the stroke can be freely selected within a range wherein the sum of both does not exceed the magnet width, as mentioned in the summary above, so in the event that the stroke is to be extended, the width of the armature coil unit can be reduced, and conversely, in the event of increasing the thrust constant, the width of the armature coil unit can be increased. Providing gaps between the layers of magnets making up the magnetic poles, and making the sum of the width of the armature coil unit and the stroke to be greater than the magnet width so as to increase the number of coil turns in order to raise the thrust constant may be conceived, but the configuration described in the above embodiments is easy to assemble, since the magnets are in contact one with another. Also, the entire face of the armature coil unit is constantly facing the magnet, so the strong portion of the magnetic flux density can be constantly utilized. Also, a high thrust constant can be obtained with fewer turns, so the armature coil can be configured to be lighter in weight. In order to further reduce the weight of the above embodiments, circumferential grooves 32 may be further provided on the bobbin 4 at the portion between the winding grooves 11 and 12 which is thicker than other portions, or the portion between the winding grooves 12 and 13 which is thicker than other portions, as shown in FIG. 28. The winding is not obstructed in any way even if the grooves 32 traverse the communicating grooves 14 and 15. Providing such grooves 32 also serves to reduce the current flowing through the bobbin in the event that the bobbin is a conductor.

The coil wire can be wound onto the armature coil according to the above embodiment in a precise manner without protruding from the outer circumference of the bobbin, by following the method shown in FIG. 8. The winding direction is opposite at adjacent winding grooves, so the armature coil units cooperatively generate thrust in the same direction upon applying current to the coil. Also, the position where the coil wire enters and exits the armature coils is the same, so the wiring is neat and orderly. The sum of the number of turns at each of the armature coil units is the same, so coil wires can be disposed effectively at all of the winding grooves, thereby increasing the thrust coefficient.

The present invention is not limited to the above embodiments; rather, a wide range of modifications and adaptations can be made within the scope of the invention. For example:

(1) While the above embodiments have three armature coil units of the armature coil provided in the axial direction, and three magnetic poles from permanent magnets provided in the axial direction so as to correspond thereto, four or more may be arrayed in the axial direction.

Figure 29:
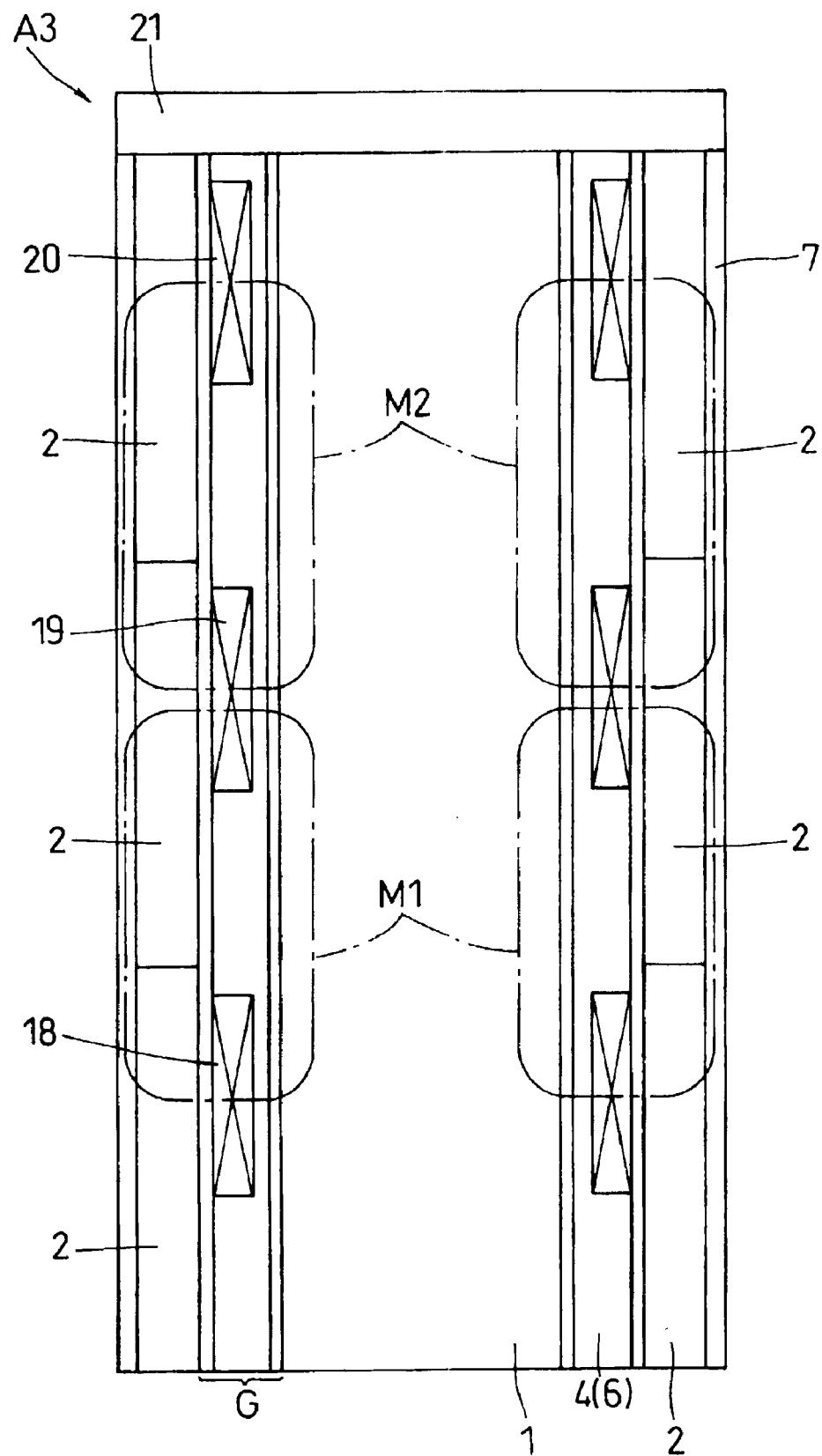
FIG. 29 is a vertical-sectional view illustrating a voice coil linear actuator wherein the magnet is provided on the outer yoke side.

(2) While the above embodiments have a permanent magnet for the center stator side, a voice coil linear actuator A3 according to the present embodiment may, as shown in FIG. 29, have a fixed outer yoke 7 formed of a ferromagnetic material disposed on the perimeter of he armature coil 4, with the permanent magnets 2 fixed on the inner circumference face of the outer yoke 7 at multiple positions in the axial direction.

(3) While the above embodiments have a center yoke and outer yoke, the outer yoke may be omitted.

Figure 30:
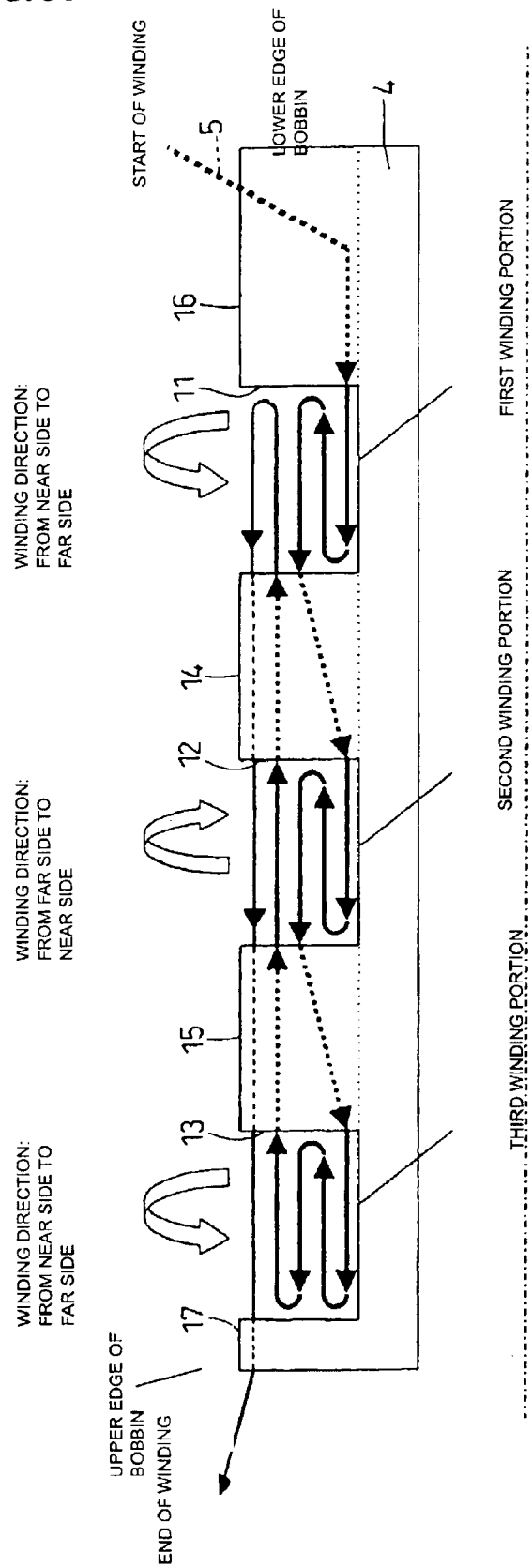
FIG. 30 is an explanatory diagram illustrating a modification of the process for winding the coil wire on the bobbin.

(4) A coil wire winding method for the armature coil such as shown in FIG. 30, for example, may be used instead of that described in the above embodiments. In detail:

(a) The coil wire 5 is introduced from around the bottom of the bobbin 4 through the communicating groove 16, to the first winding groove 11.

(b) Subsequently, the coil wire 5 is wound on the first winding groove 11 so as to form three layers in the radial direction (the winding direction at this time is the forward direction).

(c) Subsequently, the coil wire 5 moves to the second winding groove 12 through the communicating groove 14, and the coil wire 5 is wound so as to form three layers in the radial direction in a winding direction opposite to that on the first winding groove 11.

(d) Subsequently, the coil wire 5 moves to the third winding groove 13 through the communicating groove 15, and is wound so as to form four layers in the radial direction in the forward winding direction.

(e) Subsequently, the coil wire 5 moves to the second winding groove 12 again through the communicating groove 15, and is wound so as to form one more layer in the radial direction in the reverse winding direction.

(f) Subsequently, the coil wire 5 moves to the first winding groove 11 through the communicating groove 14, and is wound so as to form two more layers in the radial direction in the forward winding direction.

(g) Subsequently, the coil wire 5 moves to the second winding groove 12 through the communicating groove 14, and is wound so as to form one more layer in the radial direction in the reverse winding direction.

(h) Subsequently, the coil wire 5 moves to the third winding groove 13 through the communicating groove 15, and is wound so as to form one more layer in the radial direction in the forward winding direction.

(i) Subsequently, the remainder of the coil wire 5 is extended from around the top of the bobbin 4 through the communicating groove 17, thereby ending the winding process.

(5) While with the winding method in the first and second embodiments, the coil wire is wound onto the first winding groove at first then wound to the adjacent winding groove and so forth, following which the coil wire returns to the first winding groove where the remaining winding is performed so as to complete the winding, another arrangement may be made wherein, in the event that complete winding has not been completed at the point of the coil wire returning to the first winding groove, the coil wire goes to the adjacent winding groove again and continues winding, so that the coil wire finally returns to the first winding groove, where the winding process ends.

Figure 31:
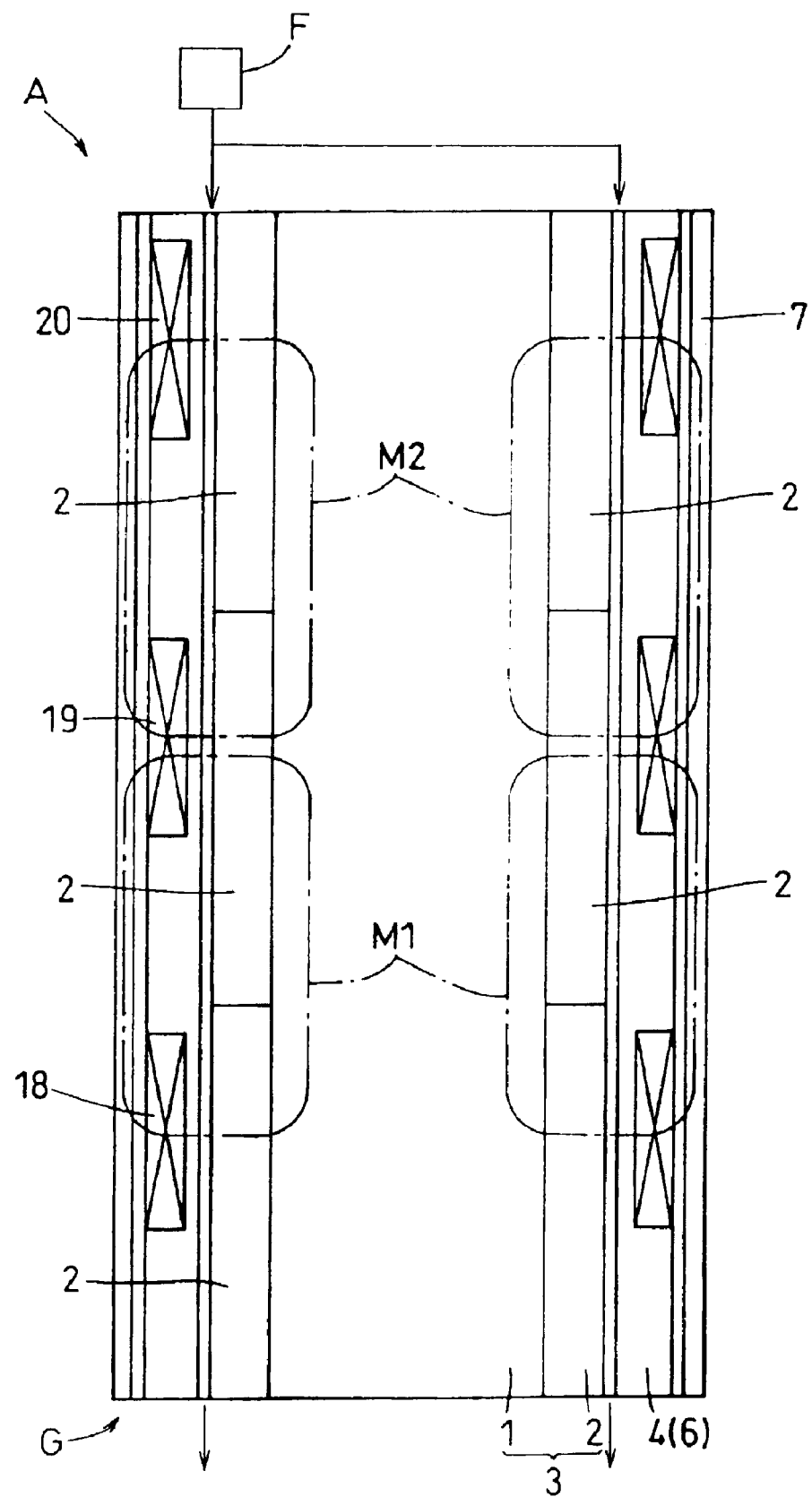
FIG. 31 is a vertical-sectional view illustrating a voice coil linear actuator having cooling means.

(6) Though the above first and second embodiments are not shown having means for cooling the heat generated at the coil wire 5, an arrangement may be made as shown in FIG. 31, wherein an air source F is provided, so that air sent in by the air source F blows downwards through the gap G between the outer yoke 7 and the center stator 3, thus dissipating heat.

Figure 34:
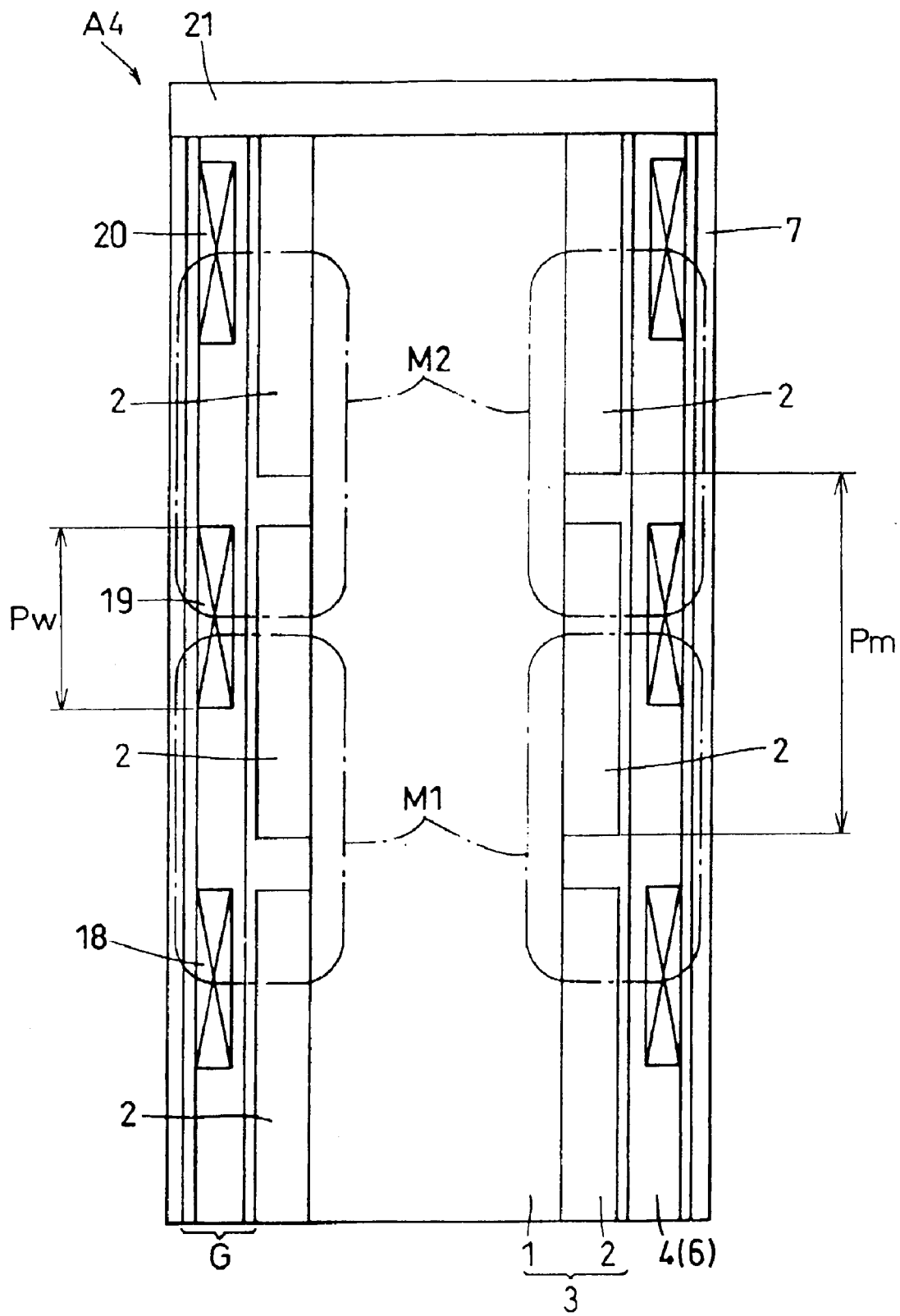
FIG. 34 is a vertical-sectional view of a modification of the voice coil linear actuator according to the present invention.

(7) While the above embodiments show at least three permanent magnets disposed in contact one with another in the axial direction, an arrangement may be made for a voice coil actuator A4 as shown in FIG. 34, for example, wherein adjacent permanent magnets 2 in the axial direction are disposed with a predetermined interval therebetween. In this case, the adjacent permanent magnets 2 in the axial direction are disposed at a constant pitch Pm in the axial direction. Also, each of the armature coil units 18, 19, and 20 of the armature coil 4 provided corresponding to the permanent magnets 2 are at a constant width Pw in the axial direction, and also the center distance between adjacent armature coil units in the axial direction is set so as to be Pm. In this case, if the movement stroke of the armature coil 4 is denoted as Ps, then $Pw+Ps \leqq Pm$.

Figure 35:
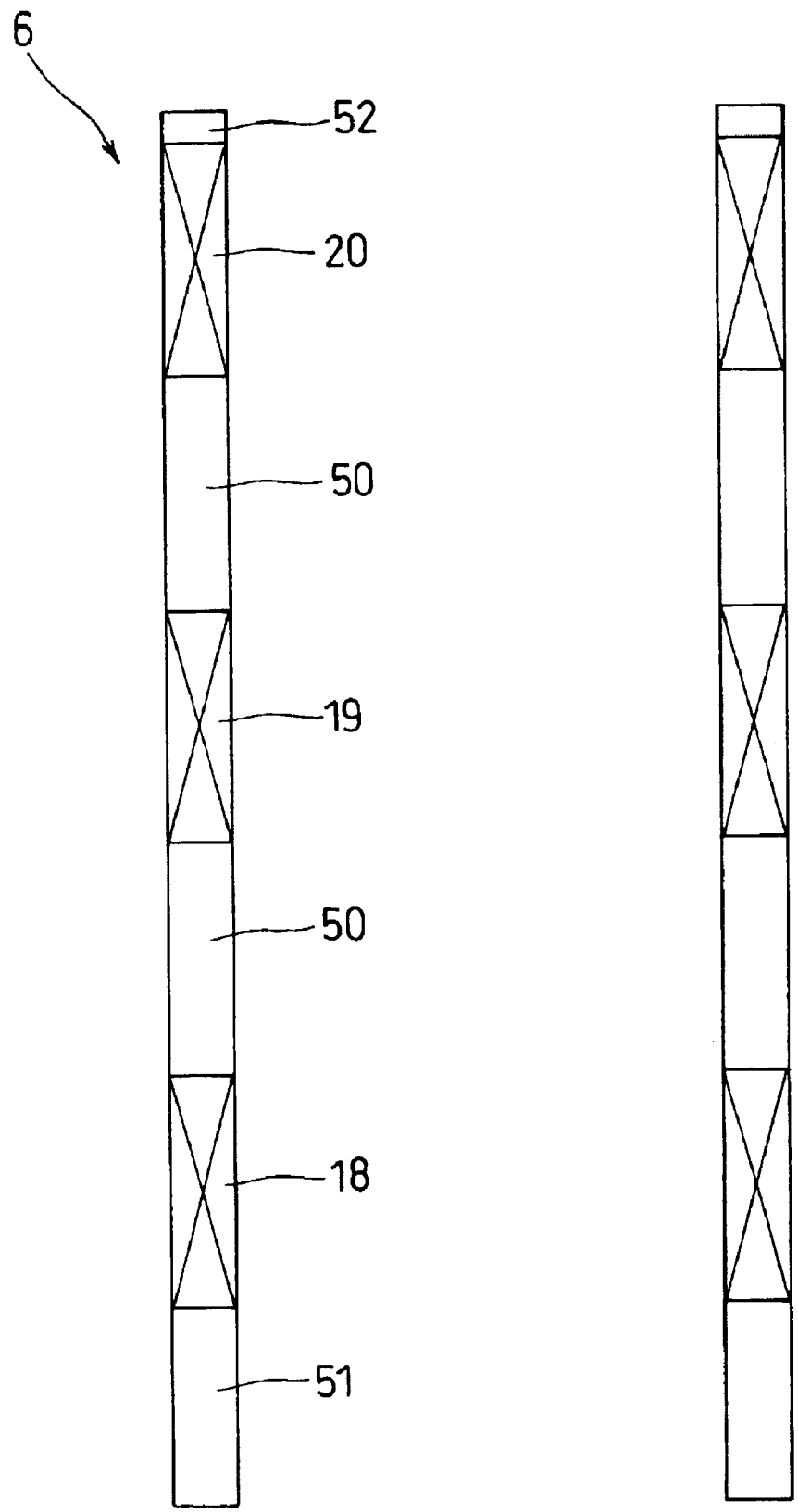
FIG. 35 is a vertical-sectional view illustrating a modification of an armature coil.

(8) While the above embodiments show a configuration wherein a coil wire is wound onto ring-shaped groove portions formed on the perimeter of a cylindrical bobbin to form armature coil units, thus forming the armature coil, the configuration such as shown in FIG. 35 may be used instead. That is to say, the armature coil 6 shown in FIG. 35 has one coil wire 5 wound so as to form three armature coil units 18, 19, and 20, disposed in the axial direction, with the entire winding portions of the armature coil units 18, 19, and 20 being bonded respectively with an adhesive agent so as to solidify these portions, with ring-shaped spacers 50 inserted between the adjacent armature coil units 18, 19, and 20, and ring-shaped members 51 and 52 disposed on either side thereof, so as to maintain the shape of the armature coil units 18, 19, and 20 with the spacers 50 and the ring-shaped members 51 and 52. Grooves for allowing the coil wire 5 to pass in the axial direction are also provided to the spacers 50 and the ring-shaped members 51 and 52.

(9) In addition, although the respective armature coil units described above have been wound continuously in series, they could also be wound separately and driven in parallel if desired.

Although the present invention has been described in relation to particular embodiments thereof, many other variations and modifications and other uses will become apparent to those skilled in the art. Therefore, the present invention is not limited by the specific disclosure herein.

What is claimed is:

1. A voice coil linear actuator comprising:

an axially-shaped center yoke formed of a ferromagnetic material;

an armature coil concentrically disposed so as to move along the axial direction of said center yoke; and ring-shaped permanent magnets which have N and S magnetic poles arranged in the radial direction thereof, and are disposed concentrically as to said armature coil;

wherein said armature coil has armature coil units distributed in at least three positions in the axial direction, with adjacent pairs of said armature coil units being arranged so that electric current flows through each in opposite directions, respectively and;

wherein said ring-shaped permanent magnets are distributed in at least three positions in the axial direction at positions facing said armature coil units in the radial direction, with adjacent pairs of said permanent magnets being arranged so that N and S magnetic poles of adjacent permanent magnets facing in opposite directions in the radial direction.

2. A voice coil linear actuator according to claim 1, wherein said permanent magnets are disposed on the outer circumference of said center yoke, which is inside of said armature coil in the radial direction.

3. A voice coil linear actuator according to claim 2, wherein one said permanent magnet has a width of Pm in said axial direction, with the magnetic polarity on the outer perimeter side magnetized in the radial direction or approximately radial direction being the N pole, and an adjacent said permanent magnet has a width of Pm in said axial direction, with the magnetic polarity on the outer perimeter side magnetized in the radial direction or approximately radial direction being the S pole, and said magnets are disposed on the outer circumferential face of said center yoke so as to be alternately in contact one with another in the axial direction, with the widths of said armature coil units being equal in said axial direction, the width thereof being Pw, and the distance between the centers of armature coils adjacent in the axial direction being equal to Pm, such that Pw+Ps≦Pm holds with regard to a moving stroke being denoted by Ps.

4. A voice coil linear actuator according to claim 2, wherein one said permanent magnet with the magnetic polarity on the outer perimeter side magnetized in the radial direction or approximately radial direction being the N pole, and another said permanent magnet with the magnetic polarity on the outer perimeter side magnetized in the radial direction or approximately radial direction being the S pole, are alternately distributed in said axial direction on the perimeter of said center yoke at a pitch of Pm, with the respective widths of the armature coil units in said axial direction being equal, the width thereof being Pw, the distance between the centers of armature coils adjacent in the axial direction being equal to Pm, such that Pw+Ps≦Pm holds with regard to a moving stroke being denoted by Ps.

5. A voice coil linear actuator according to any one of claims 1 through 4, wherein said armature coil is configured of a coil wire wound on a bobbin which has winding grooves corresponding to the three armature coil units at least, and a communicating groove for connecting adjacent armature coil units so that the coil wire can be passed therethrough.

6. A voice coil linear actuator according to claim 5, wherein said bobbin comprises grooves parallel to said winding grooves at portions between said winding grooves that are adjacent in the axial direction.

7. A voice coil linear actuator according to claim 1, wherein said bobbin is formed of an insulator.

8. A voice coil linear actuator according to claim 1, wherein said bobbin is primarily formed of a conductor, with insulator layers introduced for sectioning said conductor in the axial direction and circumferential direction.

9. A voice coil linear actuator according to any one of claims 1 through 4, wherein said armature coil is configured of armature coil units formed of mutually bonded coil wires, and spacers with communicating grooves for connecting adjacent armature coil units so that the coil wires can be passed therethrough, layered alternately.

10. A voice coil linear actuator according to any one of claims 1 through 4, wherein a fixed outer yoke formed of a ferromagnetic material is disposed at the perimeter of said armature coil, so that said armature coil is movable within the gap formed between said permanent magnet and said outer yoke.

11. A voice coil linear actuator according to any of the claims 1 through 10, comprising exactly three of said permanent magnets, and three of said armature coil units.

12. A parts mounting head using the voice coil linear actuator according to any one of claims 1 through 4, said parts mounting head comprising:

a holding unit which is capable of holding a part; and a driving unit comprising said voice coil linear actuator for driving said holding unit.

13. A parts assembling apparatus, comprising the parts mounting head according to claim 12, and further comprising:

a parts supply unit for received supplied parts;

a parts mounting unit for receiving a supplied article upon which said parts are to be mounted;

wherein said parts mounting head holds parts on said parts supply unit and mounts said parts on said article which is disposed on said parts mounting unit; and a head driving unit for driving said parts mounting head.

* * * * *